(12) United States Patent
Takamatsu et al.

(10) Patent No.: US 10,046,545 B2
(45) Date of Patent: *Aug. 14, 2018

(54) FILM AND DECORATIVE FILM CAPABLE OF COVERING ARTICLE HAVING THREE-DIMENSIONAL SHAPE BY HEAT EXPANSION

(71) Applicant: 3M INNOVATIVE PROPERTIES COMPANY, St. Paul, MN (US)

(72) Inventors: Yorinobu Takamatsu, Sagamihara (JP); Akihiko Nakayama, Gotemba (JP); Daigo Yasuda, Hachioji (JP); Minori Kawagoe, Sagamihara (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/536,378

(22) PCT Filed: Dec. 21, 2015

(86) PCT No.: PCT/US2015/067076
§ 371 (c)(1),
(2) Date: Jun. 15, 2017

(87) PCT Pub. No.: WO2016/106207
PCT Pub. Date: Jun. 30, 2016

(65) Prior Publication Data
US 2017/0348953 A1 Dec. 7, 2017

(30) Foreign Application Priority Data
Dec. 24, 2014 (JP) .................................. 2014-261370

(51) Int. Cl.
*B32B 27/40* (2006.01)
*B32B 7/12* (2006.01)
(Continued)

(52) U.S. Cl.
CPC ................ *B32B 27/40* (2013.01); *B32B 7/12* (2013.01); *B32B 27/08* (2013.01); *B32B 27/36* (2013.01);
(Continued)

(58) Field of Classification Search
CPC ...... B32B 2037/268; B32B 2038/0088; B32B 2307/30; B32B 2307/75; B32B 2309/68;
(Continued)

(56) References Cited

U.S. PATENT DOCUMENTS

| | | | | |
|---|---|---|---|---|
| 3,496,000 A | * | 2/1970 | Boutle | ................. D06M 17/10 |
| | | | | 427/246 |
| 2003/0203146 A1 | * | 10/2003 | Nakanishi | .............. B41M 5/035 |
| | | | | 428/40.1 |

(Continued)

FOREIGN PATENT DOCUMENTS

| | | |
|---|---|---|
| EP | 2 689 929 | 1/2014 |
| EP | 2 752 294 | 7/2014 |

(Continued)

OTHER PUBLICATIONS

International Search report for PCT International Application No. PCT/US2015/067076 dated May 9, 2016, 5 pages.

*Primary Examiner* — Thao T Tran
(74) *Attorney, Agent, or Firm* — Philip P. Soo

(57) ABSTRACT

A film capable of covering an article having a three-dimensional shape by heat expansion provided by one embodiment of the present disclosure comprises an outermost layer disposed on an outermost surface, and a polyurethane thermal adhesive layer, which contains a thermoplastic polyurethane selected from the group consisting of polyester-based polyurethanes and polycarbonate-based polyurethanes and is thermally adhered to the article during the heat expansion, wherein the fracture strength of the polyurethane thermal
(Continued)

adhesive layer is not less than 1 MPa at 135° C., and the storage modulus at 150° C. and frequency 1.0 Hz is from $5 \times 10^3$ Pa to $5 \times 10^5$ Pa, and the coefficient of loss tan δ is not less than 0.1.

11 Claims, 3 Drawing Sheets

(51) Int. Cl.
*B32B 27/08* (2006.01)
*B32B 27/36* (2006.01)
*B32B 38/00* (2006.01)
*B32B 37/26* (2006.01)

(52) U.S. Cl.
CPC ...... *B32B 27/365* (2013.01); *B32B 2037/268* (2013.01); *B32B 2038/0088* (2013.01); *B32B 2307/30* (2013.01); *B32B 2307/75* (2013.01); *B32B 2309/68* (2013.01); *B32B 2451/00* (2013.01)

(58) Field of Classification Search
CPC ..... B32B 2451/00; B32B 27/08; B32B 27/36; B32B 27/365; B32B 27/40; B32B 7/12
USPC ......... 428/423.1, 423.3, 423.7, 424.2, 424.6, 428/424.8
See application file for complete search history.

(56) References Cited

U.S. PATENT DOCUMENTS

| | | | | |
|---|---|---|---|---|
| 2008/0302470 | A1* | 12/2008 | Sumita | C09J 7/29 156/241 |
| 2011/0070409 | A1* | 3/2011 | Nishimaki | B32B 27/40 428/190 |
| 2015/0133014 | A1* | 5/2015 | Traser | C08G 18/6637 442/64 |
| 2017/0203479 | A1* | 7/2017 | Laurin | B29C 45/14311 |
| 2017/0326906 | A1* | 11/2017 | Yasuda | B44C 1/1704 |

FOREIGN PATENT DOCUMENTS

| | | |
|---|---|---|
| JP | H9-277791 | 10/1997 |
| JP | 2006-021377 | 1/2006 |
| JP | 2007-277485 | 10/2007 |
| JP | 2008-105420 | 5/2008 |
| JP | 2009-035588 | 2/2009 |
| JP | 2004-284019 | 6/2012 |
| JP | 2012-116219 | 6/2012 |
| WO | WO 2006-102581 | 9/2006 |
| WO | WO 2012-005097 | 1/2012 |
| WO | WO 2013-016605 | 1/2013 |

* cited by examiner

FILM AND DECORATIVE FILM CAPABLE OF COVERING ARTICLE HAVING THREE-DIMENSIONAL SHAPE BY HEAT EXPANSION

CROSS REFERENCE TO RELATED APPLICATIONS

This application is a national stage filing under 35 U.S.C. 371 of PCT/US2015/067076, filed 21 Dec. 2015, which claims the benefit of Japanese Patent Application No. 2014-261370, filed 24 Dec. 2014, the disclosures of which are incorporated by reference in their entirety herein.

FIELD OF THE INVENTION

The present disclosure relates to a film, in particular to a decorative film capable of covering an article having a three-dimensional shape, and more particularly to so covering a three-dimensional article with such a film by heat expansion.

BACKGROUND ART

A decorative film is effective in improving a work environment because there are no volatile organic compounds (VOC) or any spray mist. Insert molding (IM), water transfer, the three-dimensional overlay method (TOM) and the like have generally been used as methods for applying these decorative films. By heating and stretching a decorative film using these methods to make it conform to an article surface, the decorative film can be applied to an article having a three-dimensional shape such as a molded part without defects, and sufficient adhesion to the article can be obtained immediately after application of the decorative film.

Japanese Unexamined Patent Application Publication No. 2009-035588A describes "an adhesive film comprising a substrate and an adhesive layer on the substrate, the adhesive layer comprising (A) a (meth)acrylic polymer containing a carboxyl group, in which the proportion of the number of repeating units containing a carboxyl group relative to the total number of repeating units of the polymer is from 4.0 to 25%, and having a glass transition temperature (Tg) of not higher than 25° C., and (B) a (meth)acrylic polymer containing an amino group, in which the proportion of the number of repeating units containing an amino group relative to the total number of repeating units of the polymer is from 3.5 to 15%, and having a glass transition temperature (Tg) of not lower than 75° C., wherein the blending ratio of component (A) and component (B) is from 62:38 to 75:25 by weight."

SUMMARY OF THE INVENTION

In order to achieve sufficient initial adhesion and to prevent peeling due to film contraction at temperatures exceeding 100° C., the adhesive film described in Japanese Unexamined Patent Application Publication No. 2009-035588A requires primer treatment or a primer layer on the surface of an article containing polycarbonate (PC) or acrylonitrile/butadiene/styrene copolymer (ABS). With TOM, a film application temperature of, for example, from approximately 120° C. to approximately 150° C. is reached by heating only the applied film using an IR lamp or the like, but it is generally considered to be difficult to achieve good adhesion without using a primer because the product is not sufficiently heated and its surface remains at a relatively low temperature. With IM, a film that has been three-dimensionally processed in advance as necessary is heated in a molding die, and by injecting material fused to the surface of the film, an article in which the film and the injected material are integrated in one piece is obtained, but there are cases where sufficient adhesion is not obtained depending on the combination of the adhesive layer of the film and the injected material.

The present disclosure provides a film and a decorative film which exhibit excellent adhesive strength to articles or materials containing PC or ABS even without primer treatment being performed when used in IM or TOM.

One embodiment of the present disclosure provides a film capable of covering an article having a three-dimensional shape by heat expansion, the film comprising an outermost layer disposed on an outermost surface, and a polyurethane thermal adhesive layer, which contains a thermoplastic polyurethane selected from the group consisting of polyester-based polyurethanes and polycarbonate-based polyurethanes and is thermally adhered to the article during the heat expansion, wherein the fracture strength of the polyurethane thermal adhesive layer is not less than 1 MPa at 135° C., and the storage modulus at 150° C. and frequency 1.0 Hz is from $5 \times 10^3$ Pa to $5 \times 10^5$ Pa, and the coefficient of loss tan δ is not less than 0.1.

Another embodiment of the present disclosure provides a decorative film capable of covering an article having a three-dimensional shape by heat expansion, the film comprising an outermost layer disposed on an outermost surface, and a polyurethane thermal adhesive layer, which contains a thermoplastic polyurethane selected from the group consisting of polyester-based polyurethanes and polycarbonate-based polyurethanes and is thermally adhered to the article during the heat expansion, and a design layer disposed between the outermost layer and the polyurethane thermal adhesive layer, wherein the fracture strength of the polyurethane thermal adhesive layer is not less than 1 MPa at 135° C., and the storage modulus at 150° C. and frequency 1.0 Hz is from $5 \times 10^3$ Pa to $5 \times 10^5$ Pa, and the coefficient of loss tan δ is not less than 0.1.

Yet another embodiment of the present disclosure provides an article obtained by covering and integrating an article with the film or the decorative film described above.

Due to the polyurethane thermal adhesive layer containing a thermoplastic polyurethane selected from the group consisting of polyester-based polyurethanes and polycarbonate-based polyurethanes, the film and decorative film of the present disclosure can achieve excellent adhesion to an article containing PC, ABS, or a mixture or blend thereof even without a primer treatment being performed when used in IM or TOM.

DESCRIPTION OF MODES FOR CARRYING OUT THE INVENTION

A detailed description for the purpose of illustrating representative embodiments of the present invention is given below, but these embodiments should not be construed as limiting the present invention.

In the present disclosure, "film" also encompasses laminates called "sheets" having flexibility.

In the present disclosure, the three-dimensional overlay method (referred to simply as "TOM" in the present disclosure) means a molding method including a step of preparing a film and an article having a three-dimensional shape, a step of disposing the film and the article in a vacuum chamber having a heating device on the interior, wherein the film separates the interior space of the vacuum chamber into two and the article is disposed in one of the separated interior spaces, a step of heating the film by the heating device, a step of putting both the interior space in which the article is disposed and the interior space on the opposite side thereof in a vacuum atmosphere, and a step of contacting the article with the film to cover the article with the film while putting the interior space in which the article is disposed in a vacuum atmosphere and putting the interior space on the opposite side thereof in a pressurized atmosphere or normal-pressure atmosphere.

In the present disclosure, "(meth)acrylic" refers to "acrylic or methacrylic," and "(meth)acrylate" refers to "acrylate or methacrylate."

In the present disclosure, "storage modulus" is the shear storage modulus G' when viscoelasticity measurement is performed in shear mode at frequency 1.0 Hz at a prescribed temperature using a dynamic viscoelasticity measurement device. "Coefficient of loss (tan δ)" is the ratio of shear loss modulus G"/shear storage elastic modulus G'.

The film capable of covering an article having a three-dimensional shape by heat expansion (also referred to simply as "heat-expanding film" in the present disclosure) of one embodiment of the present disclosure contains an outermost layer disposed on the outermost surface, and a polyurethane thermal adhesive layer, which contains a thermoplastic polyurethane selected from the group consisting of polyester-based polyurethanes and polycarbonate-based polyurethanes and is thermally adhered to the article during heat expansion. The fracture strength of the polyurethane thermal adhesive layer is not less than approximately 1 MPa at 135° C., and the storage modulus at 150° C. and frequency 1.0 Hz is from approximately $5\times10^3$ Pa to approximately $5\times10^5$ Pa, and the coefficient of loss tan δ is not less than approximately 0.1.

Figure 1:
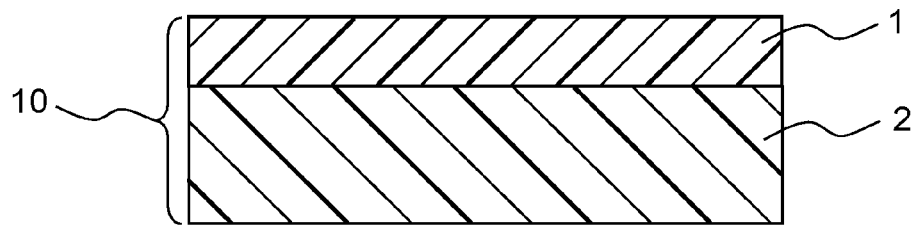
FIG. 1 is a cross-sectional view of a heat-expanding film according to an embodiment of the present disclosure.

FIG. 1 illustrates a cross-sectional view of a heat-expanding film 10 according to an embodiment of the present disclosure. The heat-expanding film 10 contains an outermost layer 11 and a polyurethane thermal adhesive layer 12. The heat-expanding film 10 may also contain additional layers such as a design layer, a metal brightening layer, a substrate layer and a bonding layer.

Figure 2:
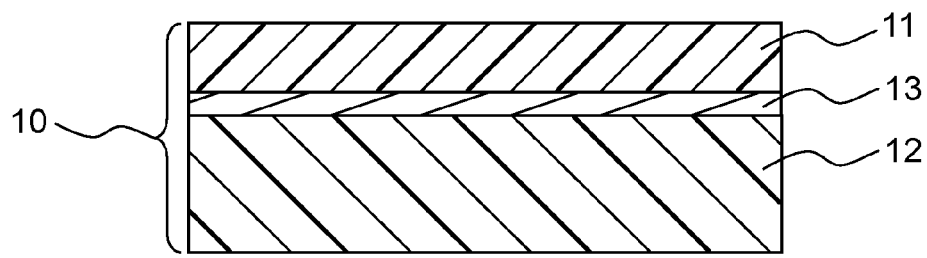
FIG. 2 is a cross-sectional view of a heat-expanding film (heat-expanding decorative film) according to another embodiment of the present disclosure.

The heat-expanding film 10 of another embodiment of the present disclosure illustrated in FIG. 2 additionally has a design layer 13 disposed between the outermost layer 11 and the polyurethane thermal adhesive layer 12. In the present disclosure, the heat-expanding film having a design layer is also called a "decorative film capable of covering an article having a three-dimensional shape by heat expansion" or a "heat-expanding decorative film." Below, descriptions relating to the "heat-expanding film" in the present disclosure also apply to the "heat-expanding decorative film."

Figure 3:
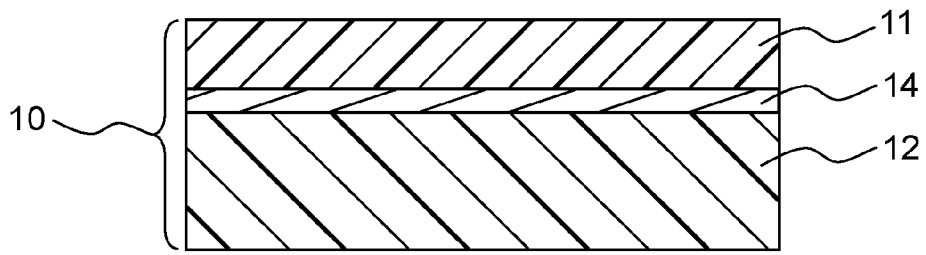
FIG. 3 is a cross-sectional view of a heat-expanding film according to yet another embodiment of the present disclosure.

The heat-expanding film 10 of another embodiment of the present disclosure illustrated in FIG. 3 additionally has a metal brightening layer 14 disposed on the polyurethane thermal adhesive layer 12 between the outermost layer 11 and the polyurethane thermal adhesive layer 12.

As the conditions for positioning the outermost layer and polyurethane thermal adhesive layer of the heat-expanding film on the outermost surface of the film, the number of layers, the type, the arrangement and so forth of the heat-expanding film are not limited to those described above.

As the outermost layer, a variety of resins, for example, acrylic resins such as polymethyl methacrylate (PMMA) and (meth)acrylic copolymer, fluorine resins such as polyurethane, ethylene/tetrafluoroethylene copolymer (ETFE), polyvinylidene fluoride (PVDF), methyl methacrylate/vinylidene fluoride copolymer (PMMA/PVDF), polyolefins such as polyvinyl chloride (PVC), polycarbonate (PC), polyethylene (PE) and polypropylene (PP), polyesters such as polyethylene terephthalate (PET) and polyethylene naphthalate, and copolymers such as ethylene/acrylic acid copolymer (EAA) and ionomers thereof, ethylene/ethyl acrylate copolymer, ethylene/vinyl acetate copolymer, and the like can be used. Due to their excellent weather resistance, acrylic resins, polyurethanes, fluorine resins, and polyvinyl chlorides are preferred, and due to their excellent scratch resistance and minimal environmental impact when incinerated or buried as waste, acrylic resins and polyurethanes are more preferred. The outermost layer may also have a multi-layer structure. For example, the outermost layer may be a laminate of films formed from the above resins, or it may by a multi-layer coating of the above resins.

The outermost layer may be formed by coating a resin composition on another layer that constitutes the heat-expanding film, such as a polyurethane thermal adhesive layer, a design layer of any constituent element, a metal brightening layer, a substrate layer, a bonding layer or the like. Alternatively, an outermost layer film can be formed by coating the resin composition on a different liner, and that film can be laminated on another layer via a bonding layer. If the polyurethane thermal adhesive layer, the design layer, the metal brightening layer, and the substrate layer and the like are adhesive to the outermost layer film formed on the liner, the outermost layer film can be laminated directly onto these layers without having a bonding layer therebetween. For example, the outermost layer film can be formed by coating resin material such as a curable acrylic resin composition, reactive polyurethane composition, or the like on a liner or the like using knife coating, bar coating, blade coating, doctor coating, roll coating, cast coating and the like, and then heat curing as necessary.

An outermost layer formed into a film beforehand through extrusion, drawing and the like may be used. This type of film can be laminated on the design layer, metal brightening layer, substrate layer, and the like via a bonding layer. Alternatively, if the design layer, the metal brightening layer, the substrate layer, and the like are adhesive to this film, the film can be laminated directly onto these layers without having a bonding layer therebetween. By using a film with high flatness, a structure can be given an appearance of higher surface flatness. Furthermore, the outermost layer can be formed by multi-layer extrusion with other layers. A resin containing polymethyl methacrylate (PMMA), butyl polyacrylate, (meth)acrylic copolymer, ethylene/acrylic copolymer, ethylene vinyl acetate/acrylic copolymer resin, and the like can be formed into a film and used as an acrylic film. An acrylic film has excellent transparency, is resistant to heat and light, and will not easily cause discoloration or luster change when used outdoors. Also, an acrylic film is further characterized by excellent contamination resistance without the use of a plasticizer and the ability to be processed by deep drawing due to excellent moldability. It is particularly preferable to make PMMA the main component.

The outermost layer may have a variety of thicknesses, but it is generally not less than approximately 1 μm, not less than approximately 5 μm, or not less than approximately 10 μm, and not more than approximately 200 μm, not more than approximately 100 μm, or not more than approximately 80 μm. When the heat-expanding film is applied to an article with a complex shape, in terms of shape tracking performance, a thin outermost layer is advantageous; for example, a thickness of not more than approximately 100 μm or not more than approximately 80 μm is preferable. On the other hand, a thick outermost layer is more advantageous in terms of giving the structure high light resistance and/or weather resistance; for example, not less than approximately 5 μm or not less than approximately 10 μm is preferable.

The outermost layer may include, as necessary, ultraviolet absorbers such as benzotriazole, Tinuvin 1130 (manufactured by BASF), and the like, and hindered amine light stabilizers (HALS) such as Tinuvin 292 (manufactured by BASF), and the like. Through the use of ultraviolet absorbers, hindered amine light stabilizers, and the like, discoloration, fading, deterioration, and the like of coloring material, in particular organic pigments that are relatively sensitive to light such as ultraviolet light and the like, included in the design layer and the like can be effectively prevented. The outermost layer may include a hard coating material, a luster-imparting agent, and the like, and may also have an additional hard coating layer. In order to provide an intended appearance, the outermost layer may be transparent, semitransparent, or opaque. It is advantageous if the outermost layer is transparent.

The polyurethane thermal adhesive layer functions so as to adhere the heat-expanding film to the article that is to be adhered to during heat expansion. The polyurethane thermal adhesive layer contains a thermoplastic polyurethane selected from the group consisting of polyester-based polyurethanes and polycarbonate-based polyurethanes.

Thermoplastic polyurethane (TPU) is a polymer having a urethane bond in the molecule, generally obtained by a polyaddition reaction of a polyisocyanate such as high-molecular-weight polyol or diisocyanate and a chain extender, using a catalyst such as dibutyltin dilaurate as necessary. When heated, it softens and exhibits fluidity. A hard segment is formed by the reaction of the chain extender and the polyisocyanate, while on the other hand, a soft segment is formed by the reaction of the high-molecular-weight polyol and the polyisocyanate.

Examples of the high-molecular-weight polyol include polyester polyol, polycarbonate polyol, and combinations thereof having not less than two hydroxyl groups and having a number average molecular weight of not less than 400. Polyester polyols form polyester-based polyurethanes, and polycarbonate polyols form polycarbonate-based polyurethanes. In the present disclosure, a polyol having both an ester bond and a carbonate bond in the molecule is classified as a polycarbonate polyol. A polyurethane formed by a polyol containing both polyester polyol and polycarbonate polyol is classified as a polycarbonate-based polyurethane.

Since there are cases where thermoplasticity is diminished when an excessive crosslinking structure is introduced into a polyurethane, the polyester polyol is preferably a polyester diol, and the polycarbonate polyol is preferably a polycarbonate diol.

Polyester polyol may be obtained by, for example, a condensation reaction or an ester exchange reaction of a short-chain polyol having not less than two hydroxyl groups and having a number average molecular weight of not less than 400 with a polybasic acid or alkyl ester, acid anhydride, or acid halide thereof. In addition to the short-chain polyol, a short-chain polyamine having not less than two amino groups and having a number average molecular weight of less than 400 may be involved in the condensation reaction or ester exchange reaction.

Examples of short-chain polyols include dihydric alcohols such as ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 3-methyl-1,5-pentanediol, 2,4-diethyl-1,5-pentanediol, 1,6-hexanediol, 2,6-dimethyl-1-octene-3,8-diol, $C_7$-$C_{22}$ alkane diols, cyclohexanediol, cyclohexane dimethanol, bisphenol A, hydrogenated bisphenol A, 1,4-dihydroxy-2-butene, bishydroxy ethoxy benzene, xylene glycol, bishydroxy ethylene terephthalate, diethylene glycol, trioxyethylene glycol, tetraoxyethylene glycol, pentaoxyethylene glycol, hexaoxyethylene glycol, dipropylene glycol, trioxypropylene glycol, tetraoxypropylene glycol, pentaoxypropylene glycol, and hexaoxypropylene glycol; trihydric alcohols such as glycerol, 2-methyl-2-hydroxymethyl-1,3-propanediol, 2,4-dihydroxy-3-hydroxymethyl pentane, 1,2,6-hexanetriol, trimethylol propane, and 2,2-bis(hydroxymethyl)-3-butanol; tetrahydric alcohols such as pentaerythritol and diglycerol; pentahydric alcohols such as xylitol; and hexahydric alcohols such as sorbitol, mannitol, allitol, iditol, dulcitol, altritol, inositol, and dipentaerythritol, and the like. Short-chain polyols also encompass polyoxyalkylene polyols obtained by adding an alkylene oxide such as ethylene oxide or propylene oxide to these short-chain polyols. Short-chain polyols may be used as one type alone or in a combination of two or more types. Since there are cases where thermoplasticity is diminished when an excessive crosslinking structure is introduced into a polyurethane, a dihydric alcohol is preferably used as the short-chain polyol.

Examples of polybasic acids include saturated aliphatic dicarboxylic acids such as oxalic acid, malonic acid, succinic acid, methylsuccinic acid, glutaric acid, adipic acid, 1,1-dimethyl-1,3-dicarboxypropane, 3-methyl-3-ethyl glutaric acid, azelaic acid, and sebacic acid; unsaturated aliphatic dicarboxylic acids such as maleic acid, fumaric acid, and itaconic acid; aromatic dicarboxylic acids such as orthophthalic acid, isophthalic acid, terephthalic acid, toluene dicarboxylic acid, and naphthalene dicarboxylic acid; alicyclic dicarboxylic acids such as hexahydrophthalic acid; and other polyhydric carboxylic acids such as dimer acids, hydrogenated dimer acids, and HET acids. Examples of alkyl esters, acid anhydrides, and acid halides of polybasic acids include methyl esters and ethyl esters of the above polybasic acids and the like; oxalic acid anhydride, succinic acid anhydride, maleic acid anhydride, phthalic acid anhydride, 2-$C_{12}$-$C_{18}$ alkyl succinic acid anhydride, tetrahydrophthalic acid anhydride, trimellitic acid anhydride, and the like; oxalic acid dichloride, adipic acid dichloride, sebacic acid dichloride, and the like. Polybasic acids may be used as one type alone or in a combination of two or more types. Since there are cases where thermoplasticity is diminished when an excessive crosslinking structure is introduced into a polyurethane, a dicarboxylic acid, or alkyl ester, acid anhydride or acid halide thereof is preferably used as the polybasic acid.

Examples of short-chain polyamines include short-chain diamines such as ethylene diamine, 1,3-propane diamine, 1,3-butane diamine, 1,4-butane diamine, 1,6-hexamethylene diamine, 1,4-cyclohexane diamine, 3-aminomethyl-3,5,5-trimethyl cyclohexylamine, 4,4'-dicyclohexylmethane diamine, 2,5(2,6)-bis(aminomethyl)bicyclo[2.2.1]heptane, 1,3-bis(aminomethyl)cyclohexane, hydrazine, and o-, m-, or p-tolylene diamine; short-chain triamines such as diethylene triamine; and short-chain polyamines having four or more amino groups such as triethylene tetramine and tetraethylene pentamine. Short-chain polyamines may be used as one type alone or in a combination of two or more types. Since there are cases where thermoplasticity is diminished when an excessive crosslinking structure is introduced into a polyurethane, a short-chain diamine is preferably used as the short-chain polyamine.

Polyester polyols that may be used include vegetable oil-based polyester polyols obtained by condensation reaction of a hydroxycarboxylic acid such as hydroxyl group-containing vegetable oil aliphatic acids; and polycaprolactone polyols and polyvalerolactone polyols obtained by ring-opening polymerization of lactones such as ε-caprolactone and γ-valerolactone and lactides such as L-lactide and D-lactide.

Examples of polycarbonate polyols include ring-opened polymers of ethylene carbonate using a short-chain polyol as an initiator; and amorphous polycarbonate polyols obtained by copolymerizing polycarbonates obtained by reacting the above short-chain dihydric alcohols such as 1,4-butanediol, 1,5-pentanediol, 3-methyl-1,5-pentanediol, or 1,6-hexanediol with phosgene or diphenyl carbonate, the above short-chain dihydric alcohols, and the above ring-opened polymers.

Examples of the polyisocyanate include aliphatic polyisocyanates, alicyclic polyisocyanates, aromatic polyisocyanates, aromatic aliphatic polyisocyanates, and the like, and multimers (dimers, trimers and the like), biuret-modified products, allophanate-modified products, oxadiazine trione-modified products, and carbodiimide-modified products of these polyisocyanates. Polyisocyanates may be used as one type alone or in a combination of two or more types. Since there are cases where thermoplasticity is diminished when an excessive crosslinking structure is introduced into a polyurethane, a diisocyanate is preferably used as the polyisocyanate.

Examples of aliphatic polyisocyanates include ethylene diisocyanate, trimethylene diisocyanate, tetramethylene diisocyanate, pentamethylene diisocyanate (PDI), hexamethylene diisocyanate (HDI), octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanate-4-isocyanatomethyloctane, 2,5,7-trimethyl-1,8-diisocyanate-5-isocyanatomethyloctane, bis(isocyanatoethyl)carbonate, bis(isocyanatoethyl)ether, 1,4-butylene glycol dipropylether-ω,ω'-diisocyanate, lysine isocyanatomethyl ester, lysine triisocyanate, 2-isocyanatoethyl-2,6-diisocyanate hexanoate, 2-isocyanatopropyl-2,6-diisocyanate hexanoate, bis(4-isocyanate-n-butylidene)pentaerythritol, and 2,6-diisocyanate methylcaproate.

Examples of alicyclic polyisocyanates include isophorone diisocyanate, 1,3-bis(isocyanatomethyl)cyclohexane, trans, trans-, trans,cis- and cis,cis-dicyclohexylmethane-4,4'-diisocyanate, and mixtures thereof (hydrogenated MDI), 1,3- or 1,4-cyclohexane diisocyanate and mixtures thereof, 1,3- or 1,4-bis(isocyanatoethyl)cyclohexane, methylcyclohexane diisocyanate, 2,2'-dimethyl dicyclohexylmethane diisocyanate, dimer acid diisocyanate, 2,5-diisocyanatomethyl bicyclo[2.2.1]-heptane, 2,6-diisocyanatomethyl bicyclo[2.2.1]-heptane (NBDI), 2-isocyanatomethyl-2-(3-isocyanatopropyl)-5-isocyanatomethyl bicyclo-[2.2.1]-heptane, 2-isocyanatomethyl-2-(3-isocyanatopropyl)-6-isocyanatomethyl bicyclo-[2.2.1]-heptane, 2-isocyanatomethyl-3-(3-isocyanatopropyl)-5-(2-isocyanatoethyl)-bicyclo-[2.2.1]-heptane, 2-isocyanatomethyl-3-(3-isocyanatopropyl)-6-(2-isocyanatoethyl)-bicyclo-[2.2.1]-heptane, 2-isocyanatomethyl-2-(3-isocyanatopropyl)-5-(2-isocyanatoethyl)-bicyclo-[2.2.1]-heptane, and 2-isocyanatomethyl-2-(3-isocyanatopropyl)-6-(2-isocyanatoethyl)-bicyclo-[2.2.1]-heptane.

Examples of aromatic polyisocyanates include 2,4-tolylene diisocyanate and 2,6-tolylene diisocyanate, and isomer mixtures of these tolylene diisocyanates (TDI), 4,4'-diphenylmethane diisocyanate, 2,4'-diphenylmethane diisocyanate, and 2,2'-diphenylmethane diisocyanate, and isomer mixtures of these diphenylmethane diisocyanates (MDI), toluidine diisocyanate (TODI), paraphenylene diisocyanate and naphthalene diisocyanate (NDI).

Examples of aromatic aliphatic polyisocyanates include 1,3- or 1,4-xylylene diisocyanate or mixtures thereof (XDI), and 1,3- or 1,4-tetramethylxylylene diisocyanate or mixtures thereof (TMXDI).

Examples of chain extenders include dihydric alcohols such as ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 3-methyl-1,5-pentanediol, 2,4-diethyl-1,5-pentanediol, 1,6-hexanediol, 2,6-dimethyl-1-octene-3,8-diol, $C_7$-$C_{22}$ alkane diols, cyclohexanediol, cyclohexane dimethanol, bisphenol A, hydrogenated bisphenol A, 1,4-dihydroxy-2-butene, bishydroxy ethoxy benzene, xylene glycol, bishydroxy ethylene terephthalate, diethylene glycol, trioxyethylene glycol, tetraoxyethylene glycol, pentaoxyethylene glycol, hexaoxyethylene glycol, dipropylene glycol, trioxypropylene glycol, tetraoxypropylene glycol, pentaoxypropylene glycol, and hexaoxypropylene glycol; trihydric alcohols such as glycerol, 2-methyl-2-hydroxymethyl-1,3-propanediol, 2,4-dihydroxy-3-hydroxymethyl pentane, 1,2,6-hexanetriol, trimethylol propane and 2,2-bis(hydroxymethyl)-3-butanol; tetrahydric alcohols such as pentaerythritol and diglycerol; pentahydric alcohols such as xylitol; and hexahydric alcohols such as sorbitol, mannitol, allitol, iditol, dulcitol, altritol, inositol and dipentaerythritol. Chain extenders also encompass polyoxyalkylene polyols obtained by adding an alkylene oxide such as ethylene oxide or propylene oxide to these short-chain polyols. Chain extenders may be used as one type alone or in a combination of two or more types. Since there are cases where thermoplasticity is diminished when an excessive crosslinking structure is introduced into a polyurethane, a dihydric alcohol is preferably used as the chain extender.

The weight average molecular weight of the thermoplastic polyurethane is generally not less than approximately 30,000, not less than approximately 50,000 or not less than approximately 80,000, and not greater than approximately 300,000, not greater than approximately 200,000, or not greater than approximately 150,000. The weight average molecular weight and the number average molecular weight of the thermoplastic polyurethane may be determined by gel permeation chromatography (GPC) using tetrahydrofuran (THF) or N-methylpyrrolidone (NMP) as the solvent, and using standard polystyrene (if the solvent is THF) or standard polymethyl methacrylate (if the solvent is NMP).

In several embodiments, the polyisocyanate that is the main starting material of the thermoplastic polyurethane is incorporated into the thermoplastic polyurethane in an amount of not less than approximately 20 mass %, not less than approximately 22 mass %, or not less than approximately 25 mass %, and not greater than approximately 40 mass %, not greater than approximately 38 mass %, or not greater than approximately 35 mass % relative to the total amount of thermoplastic polyurethane.

As the polyurethane thermal adhesive layer, one obtained by forming thermoplastic polyurethane into film by molding, extrusion, expansion, or the like may be used. This type of film can be laminated on the design layer, metal brightening layer, substrate layer, and the like via a bonding layer. Alternatively, if the design layer, the metal brightening layer, the substrate layer, and the like are adhesive to this film, these layers can be laminated directly onto the film without having a bonding layer therebetween. The polyurethane thermal adhesive layer film may also be formed by coating the thermoplastic polyurethane or a solvent-diluted composition containing the components thereof (polyol and polyisocyanate, and catalyst as necessary) on a liner, removing the solvent, and curing if necessary, and that film may be laminated onto a design layer, metal brightening layer, substrate layer, or the like with a bonding layer therebetween. If the design layer, the metal brightening layer, the substrate layer, and the like are adhesive to the polyurethane thermal adhesive layer film, these layers can be coated or laminated directly onto the polyurethane thermal adhesive layer film without having a bonding layer therebetween. The polyurethane thermal adhesive layer can be formed through multi-layer extrusion with other layers.

The fracture strength of the polyurethane thermal adhesive layer is not less than approximately 1 MPa at 135° C. In several embodiments, the fracture strength of the polyurethane thermal adhesive layer at 135° C. is not less than approximately 2 MPa, not less than approximately 3 MPa, or not less than approximately 5 MPa, and not greater than approximately 50 MPa, not greater than approximately 30 MPa, or not greater than approximately 20 MPa. The fracture strength of the polyurethane thermal adhesive layer is the value measured when a test piece fractures when pulled at a pulling rate of 300 mm/minute at temperature 135° C. using a dumbbell test piece of width 10.0 mm and gauge length 20.0 mm according to JIS K 7311 (1995). Due to the fracture strength of the polyurethane thermal adhesive layer being not less than approximately 1 MPa at 135° C., the heat-expanding film can be prevented from fracturing during operations where the pressure changes at high temperature in IM or TOM.

The storage modulus of the polyurethane thermal adhesive layer at 150° C. and frequency 1.0 Hz is not less than approximately $5 \times 10^3$ Pa and not greater than approximately $5 \times 10^5$ Pa. In several embodiments, the storage modulus of the polyurethane thermal adhesive layer at 150° C. and frequency 1.0 Hz is not less than approximately $1 \times 10^4$ Pa or not less than approximately $2 \times 10^4$ Pa, and not greater than approximately $2 \times 10^5$ Pa or not greater than approximately $1 \times 10^5$ Pa. Due to the storage modulus of the polyurethane thermal adhesive layer at 150° C. being in this range, the heat-expanding film can soften to a degree sufficient to adhere to an article without completely losing its shape when heated to the adhesion temperature in IM or TOM.

The coefficient of loss tan δ of the polyurethane thermal adhesive layer is not less than approximately 1.0 at 150° C. and frequency 1.0 Hz. In several embodiments, the coefficient of loss tan δ of the polyurethane thermal adhesive layer at 150° C. and frequency 1.0 Hz is not less than approximately 1.05 or not less than approximately 1.1, and not greater than approximately 5.0 or not greater than approximately 3.0. Due to the coefficient of loss tan δ of the polyurethane thermal adhesive layer at 150° C. and frequency 1.0 Hz being not less than approximately 1.0, the heat-expanding film conforms to the recesses and protrusions of the article surface or has sufficient fluidity to embed such recesses and protrusions when heated to the adhesion temperature in IM or TOM.

In several embodiments, elongation of the polyurethane thermal adhesive layer at 135° C. is not less than approximately 200%, not less than approximately 300%, or not less than approximately 500%, and not greater than approximately 2000%, not greater than approximately 1500%, or not greater than approximately 1000%. The elongation E of the polyurethane thermal adhesive layer is the value obtained from the formula $E\ (\%) = [(L_1 - L_0)/L_0] \times 100$, when the gauge length upon a test piece fracturing when pulled at a pulling rate of 300 mm/minute at temperature 135° C. using a dumbbell test piece of width 10.0 mm and gauge length 20.0 mm is taken as $L_1$ (mm), and the initial gauge length is taken as $L_0$ (mm)=(20.0 mm), according to JIS K 7311 (1995). Due to the elongation of the polyurethane thermal adhesive layer at 135° C. being not less than approximately 200%, the heat-expanding film conforms well even to an article surface with a high radius of curvature in IM or TOM.

In several embodiments, the ratio of the storage modulus at −20° C. and the storage modulus at 110° C. (−20° C. storage modulus/110° C. storage modulus) of the polyurethane thermal adhesive layer measured at frequency 1.0 Hz is not greater than approximately 100, not greater than approximately 80, or not greater than approximately 50, and not less than approximately 1, not less than approximately 2, or not less than approximately 3. Due to the ratio of the storage modulus at −20° C. and the storage modulus at 110° C. of the polyurethane thermal adhesive layer measured at frequency 1.0 Hz being not greater than 100, interface peeling over time between the polyurethane thermal adhesive layer and other layers it contacts, particularly the metal brightening layer, can be prevented.

Furthermore, in several embodiments, the ratio of number average molecular weight and weight average molecular weight (weight average molecular weight/number average molecular weight) in the polyurethane thermal adhesive layer is not more than approximately 9.0, and preferably not more than approximately 5.0. Due to the ratio of weight average molecular weight relative to number average molecular weight being not more than approximately 9.0, the occurrence of visual defects (so-called fish-eye) during polyurethane film molding can be suppressed and a heat-expanding film having excellent appearance can be provided. Quality with respect to visual defects may be judged by the number of defects not less than 0.1 mm² in size that can be seen on the urethane thermal adhesive layer, where not more than approximately 30 is preferred, and not more than approximately 20 is more preferred.

The polyurethane thermal adhesive layer may have a variety of thicknesses, but it is generally not less than approximately 15 μm, not less than approximately 30 μm, or not less than approximately 50 µm, and not more than approximately 1000 µm, not more than approximately 800 µm, or not more than approximately 500 µm.

Examples of the optional design layer include a color layer that exhibits a paint color, metallic color, or the like, a pattern layer that imparts a logo, an image, or a pattern such as a wood grain pattern, stone grain pattern, geometric pattern, or leather pattern to the structure, a relief (embossed pattern) layer in which recesses and protrusions are provided on the surface, and combinations thereof.

Pigments that may be used for the color layer by dispersion in a binder resin such as acrylic resin, polyurethane resin or the like are exemplified by inorganic pigments such as titanium oxide, carbon black, chrome yellow, yellow iron oxide, colcothar, red iron oxide, or the like; organic pigments such as phthalocyanine pigments (phthalocyanine blue, phthalocyanine green, or the like), azo lake pigments, indigo pigments, perinone pigments, perylene pigments, quinophthalone pigments, dioxazine pigments, quinacridone pigments (quinacridone red, or the like), or the like; aluminum brightening agents such as aluminum flake, vapor-deposited aluminum flake, metal oxide-coated aluminum flake, colored aluminum flake, or the like; and pearlescent brightening materials such as flake-like mica and synthetic mica coated with a metal oxide such as titanium oxide or iron oxide, or the like.

As a pattern layer, a film, sheet, metal foil, or the like having a pattern, logo, design, or the like formed by printing such as gravure direct printing, gravure offset printing, inkjet printing, laser printing, or screen printing, coating such as gravure coating, roll coating, die coating, bar coating or knife coating, punching or etching may be used.

As a relief layer, a thermoplastic resin film having a relief form on the surface obtained by a conventional known method such as embossing, scratching, laser processing, dry etching, hot pressing, or the like may be used. A relief layer can be formed by coating a heat-curable or radiation-curable resin such as curable acrylic resin on a release film having a relief form, curing it by heat or radiation, and removing the release film. The thermoplastic resin, heat-curable resin and radiation-curable resin used in the relief layer are not particularly limited, but may be fluorine-based resin, polyester-based resin such as PET and PEN, acrylic resin, polyethylene, polypropylene, thermoplastic elastomer, polycarbonate, polyamide, ABS resin, acrylonitrile/styrene resin, polystyrene, vinyl chloride, polyurethane, and the like.

The design layer may have a variety of thicknesses, and it is generally not less than approximately 0.5 µm, not less than approximately 5 µm, or not less than approximately 20 µm, and not more than approximately 300 µm, not more than approximately 200 µm, or not more than approximately 100 µm.

The heat-expanding film may also contain a metal brightening layer containing a metal such as aluminum, nickel, gold, platinum, chromium, iron, copper, tin, indium, silver, titanium, lead, zinc, or germanium, or alloys or compounds thereof, formed by vacuum deposition, sputtering, ion plating, plating, or the like on a layer that constitutes the heat-expanding film. Because this type of metal brightening layer has high luster, it may be suitably used in a substitute film for chrome plating or the like. The thickness of the metal brightening layer may be, for example, not less than approximately 5 nm, not less than approximately 10 nm, or not less than approximately 20 nm, and not more than approximately 10 µm, not more than approximately 5 µm, or not more than approximately 2 µm.

In an embodiment, the metal brightening layer is disposed on top of the polyurethane thermal adhesive layer, and the thermoplastic polyurethane contained in the polyurethane thermal adhesive layer is a polycarbonate-based polyurethane. In this embodiment, interlayer adhesion is particularly excellent between the metal brightening layer and the polyurethane thermal adhesive layer.

A variety of resins, for example, acrylic resins that include polymethyl methacrylate (PMMA), polyolefins such as polyurethane (PU), polyvinyl chloride (PVC), polycarbonate (PC), acrylonitrile/butadiene/styrene copolymer (ABS), polyethylene (PE), polypropylene (PP), and the like, polyesters such as polyethylene terephthalate (PET), polyethylene naphthalate, and the like, and copolymers such as ethylene/acrylic acid copolymer, ethylene/ethyl acrylate copolymer, ethylene/vinyl acetate copolymer, and the like can be used as a substrate layer, which is an optional element. From the perspectives of strength, impact resistance and the like, polyurethane, polyvinyl chloride, polyethylene terephthalate, acrylonitrile/butadiene/styrene copolymer, and polycarbonate can be advantageously used as a substrate layer. A substrate layer is a supporting layer for the design layer, and provides uniform elongation during molding, and can also function as a protective layer that effectively protects the structure from external punctures and impacts. The substrate layer may have a variety of thicknesses, but from the perspective of imparting the above function to the heat-expanding film without adversely affecting the moldability of the heat-expanding film, it is generally not less than approximately 10 µm, not less than approximately 20 µm, or not less than approximately 50 µm, and not more than approximately 500 µm, not more than approximately 200 µm, or not more than approximately 100 µm.

In an embodiment, the polyurethane thermal adhesive layer also functions as a substrate layer, and the heat-expanding film does not contain an additional substrate layer. The thickness of the polyurethane thermal adhesive layer of this embodiment is, for example, not less than approximately 10 µm, not less than approximately 50 µm, not less than approximately 80 µm, or not less than approximately 100 µm, and not more than approximately 1000 µm, not more than approximately 800 µm, or not more than approximately 500 µm. By this embodiment, a heat-expanding film suitable for IM or TOM can be provided at low cost with a simplified layer structure of the heat-expanding film.

A bonding layer may be used to bond the aforementioned layers. Generally used adhesives such as a solvent-type, emulsion-type, pressure-sensitive type, heat-sensitive type, and heat-curable or ultraviolet-curable type adhesives, including acrylics, polyolefins, polyurethanes, polyesters, rubbers, and the like can be used as the bonding layer, and a heat-curable polyurethane adhesive can be advantageously used. The thickness of the bonding layer and is generally not less than approximately 0.05 µm, not less than approximately 0.5 µm, or not less than approximately 5 µm, and not more than approximately 100 µm, not more than approximately 50 µm, or not more than approximately 20 µm.

The heat-expanding film of one embodiment contains a thermally transferrable design transfer layer as the design layer. The design transfer layer general contains a thermally adherable surface layer. The design transfer layer may contain a design layer separate from the surface layer, and the surface layer may be a designable layer that contains the pigments, printing inks, and the like described above in regard to the design layer.

The surface layer generally contains a thermoplastic resin that softens and exhibits fluidity when heated. The thermoplastic resin may be one type alone or a mixture or blend of two or more types. The glass transition temperature and storage modulus of the thermoplastic resin may be selected as appropriate according to the transfer temperature of the design transfer layer and the application of the final product into which the design transfer layer is incorporated. If the thermoplastic resin is a mixture or blend of two or more types, the glass transition temperature and storage modulus indicate the values measured for the mixture or blend. Depending on the type of material that the surface layer contacts, the thermoplastic resin of the surface layer may be the same or different. Examples of the material that contacts the surface layer include polymeric resins such as acrylic resin, acrylonitrile/butadiene/styrene copolymer (ABS) resin, polycarbonate resin, polyester resin, and mixtures, blends, and combinations thereof, and metals such as tin, indium, and the like, and oxides and alloys of these metals.

The glass transition temperature of the thermoplastic resin may generally be not less than approximately −60° C., preferably not less than approximately −30° C., more preferably not less than approximately 0° C., and even more preferably not less than approximately 20° C., and not greater than approximately 150° C., not greater than approximately 125° C., or not greater than approximately 100° C. Due to the glass transition temperature of the thermoplastic resin being not less than approximately −60° C., excellent adhesive properties can be imparted to the design transfer layer. Due to the glass transition temperature of the thermoplastic resin being not greater than approximately 150° C., the transferability of the design transfer layer can be further improved. In the present disclosure, the glass transition temperature of the thermoplastic resin is defined as the peak temperature of the coefficient of loss tan δ (=shear loss modulus G"/shear storage modulus G') obtained by measuring shear storage modulus G' and shear loss modulus G" every 12 seconds in shear mode at frequency 1.0 Hz, while raising the temperature from −60° C. to 200° C. at a heating rate of 5° C./minute using a dynamic viscoelasticity measurement device.

The storage modulus of the thermoplastic resin at 50° C. can generally be not less than approximately $1.0 \times 10^5$ Pa, preferably not less than approximately $2.0 \times 10^6$ Pa, and more preferably not less than approximately $5.0 \times 10^6$ Pa, and not greater than approximately $1.0 \times 10^{10}$ Pa or not greater than approximately $5.0 \times 10^9$ Pa. Due to the storage modulus of the thermoplastic resin at 50° C. being not less than approximately $2.0 \times 10^6$ Pa, blocking properties of the design transfer layer can be improved. Due to the storage modulus of the thermoplastic resin at 50° C. being not greater than approximately $1.0 \times 10^{10}$ Pa, a design transfer layer that is easy to handle can be obtained.

In an embodiment, the surface layer contains at least one thermoplastic resin selected from the group consisting of vinyl chloride/vinyl acetate copolymer, polyurethane, polyester, (meth)acrylic resin, and phenoxy resin. In the present disclosure, "phenoxy resin" means a thermoplastic polyhydroxy polyether synthesized using a bisphenol and epichlorohydrin, and encompasses those having an epoxy group derived from a tiny amount of epichlorohydrin in the molecule (for example, at the terminal). For example, the epoxy equivalent amount of phenoxy resin is higher than that of epoxy resin, for example, not less than 5,000, not less than 7,000 or not less than 10,000.

In an embodiment, the surface layer contains phenoxy resin. A surface layer that contains phenoxy resin has particularly excellent adhesion to a metal brightening layer containing a metal such as tin, indium, or the like.

In an embodiment, the surface layer contains phenoxy resin and polyurethane. In a surface layer that contains phenoxy resin and polyurethane, the temperature required for transfer can be reduced because phenoxy resin is plasticized by polyurethane. By enabling transfer of the design transfer layer at a low transfer temperature in this manner, damage imparted to the design transfer layer during transfer can be reduced.

The glass transition temperature of the polyurethane contained in the surface layer may be not greater than approximately 60° C., not greater than approximately 40° C., or not greater than approximately 20° C. When mixed or blended with phenoxy resin, polyurethane having a glass transition temperature of not greater than approximately 60° C. can effectively plasticize the phenoxy resin. From the perspective of heat resistance of the surface layer, the glass transition temperature of the polyurethane may be not less than approximately −80° C. The glass transition temperature of the polyurethane may be determined by the same method as the glass transition temperature of the thermoplastic resin.

In an embodiment, the polyurethane is a polyester-based polyurethane. In this embodiment, compatibility of the polyurethane with phenoxy resin is particularly excellent, and component separation of polyurethane and phenoxy resin hardly occurs even when the design transfer layer is stored for a long period.

In an embodiment, the mass ratio of phenoxy resin and polyurethane resin is from 99:1 to 30:70, from 99:1 to 40:60, from 99:1 to 50:50, from 90:10 to 30:70, from 90:10 to 40:60, from 90:10 to 50:50, from 80:20 to 30:70, from 80:20 to 40:60, or from 80:20 to 50:50. Due to having this mass ratio, blocking between design transfer layers that contact each other or between the design transfer layer and other articles that contact it can be prevented or reduced.

The thickness of the surface layer is generally not less than approximately 0.2 μm, not less than approximately 0.5 μm, or not less than approximately 0.8 μm, and not more than approximately 100 μm, not more than approximately 50 μm, or not more than approximately 10 μm.

The heat-expanding film of an embodiment contains a design transfer layer containing a thermally adherable first surface layer and a thermally adherable second surface layer as design layers. Either one of the first surface layer or the second surface layer of the design transfer layer is disposed on the outermost layer side, and the other of the first surface layer or the second surface layer of the design transfer layer is disposed on the polyurethane thermal adhesive layer side.

Figure 4:
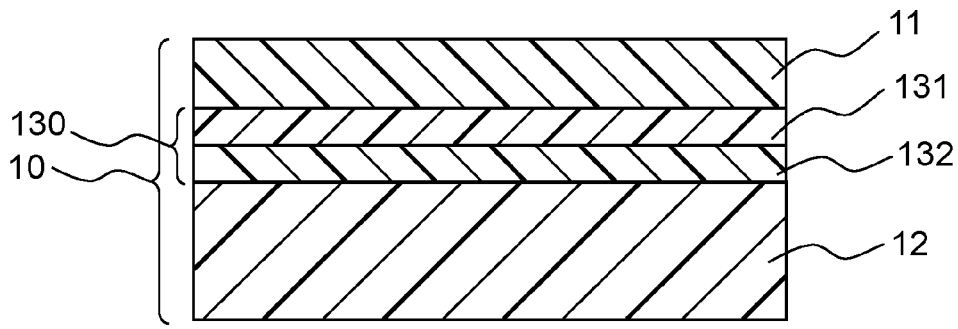
FIG. 4 is a cross-sectional view of a heat-expanding film (heat-expanding decorative film) according to yet another embodiment of the present disclosure.

FIG. 4 illustrates a cross-sectional view of such a heat-expanding film (heat-expanding decorative film) 10. The heat-expanding film 10 contains a thermally transferrable design transfer layer 130 containing a thermally adherable first surface layer 131 and a thermally adherable second surface layer 132 as design layers. The first surface layer 131 is disposed on the outermost layer 11 side, and the second surface layer 132 is disposed on the polyurethane thermal adhesive layer 12 side. In this embodiment, the first surface layer 131 or the second surface layer 132, or both the first surface layer 131 and second surface layer 132, are designable layers that contain the pigments, printing inks and the like described above in regard to the design layer.

The thermally adherable first surface layer and second surface layer of the design transfer layer contain thermoplastic resin, as already described in regard to the surface layer of the design transfer layer.

In an embodiment, at least one of the first surface layer and second surface layer contains at least one thermoplastic resin selected from the group consisting of vinyl chloride/ vinyl acetate copolymer, polyurethane, polyester, (meth) acrylic resin and phenoxy resin.

In an embodiment, at least one of the first surface layer and second surface layer contains phenoxy resin. A surface layer that contains phenoxy resin has particularly excellent adhesion to a metal brightening layer containing a metal such as tin, indium or the like.

In an embodiment, at least one of the first surface layer and second surface layer contains phenoxy resin and polyurethane. In a surface layer that contains phenoxy resin and polyurethane, the temperature required for transfer can be reduced because phenoxy resin is plasticized by polyurethane. By enabling transfer of the design transfer layer at a low transfer temperature in this manner, damage imparted to the design transfer layer during transfer can be reduced.

The glass transition temperature of the polyurethane contained in the surface layer may be not greater than approximately 60° C., not greater than approximately 40° C., or not greater than approximately 20° C. When mixed or blended with phenoxy resin, polyurethane having a glass transition temperature of not greater than approximately 60° C. can effectively plasticize the phenoxy resin. From the perspective of heat resistance of the surface layer, the glass transition temperature of the polyurethane may be not less than approximately −80° C.

In an embodiment, the polyurethane is a polyester-based polyurethane. In this embodiment, compatibility of the polyurethane with phenoxy resin is particularly excellent, and component separation of polyurethane and phenoxy resin hardly occurs even when the design transfer layer is stored for a long period.

In an embodiment, the mass ratio of phenoxy resin and polyurethane resin is from 99:1 to 30:70, from 99:1 to 40:60, from 99:1 to 50:50, from 90:10 to 30:70, from 90:10 to 40:60, from 90:10 to 50:50, from 80:20 to 30:70, from 80:20 to 40:60, or from 80:20 to 50:50. Due to having this mass ratio, blocking between design transfer layers that contact each other or between the design transfer layer and other articles that contact it can be prevented or reduced.

The thicknesses of the first surface layer and second surface layer are generally not less than approximately 0.2 µm, not less than approximately 0.5 µm, or not less than approximately 0.8 µm, and not more than approximately 100 µm, not more than approximately 50 µm, or not more than approximately 10 µm.

In another embodiment, the design transfer layer further contains a design layer between the thermally adherable first surface layer and the thermally adherable second surface layer. As the design layer, those already described above may be used.

The design transfer layer may be produced using conventional known methods such as printing, coating, lamination, or the like. The method for producing a design transfer layer of one embodiment contains a step of preparing a release layer; a step of forming a first surface layer on the release layer by printing by a printing method such as inkjet printing, gravure direct printing, gravure offset printing, screen printing or the like, or coating by a coating means such as a knife coater, bar coater, blade coater, doctor coater, roll coater, cast coater, gravure coater or the like, and, if necessary, heat curing; and a step of forming a second surface layer on the first surface layer or on another layer formed on the first surface layer by the same printing methods or coating means as the first surface layer. The method for producing the design transfer layer may further contain a step of forming a design layer on the first surface layer or on another layer formed on the first surface layer, before forming the second surface layer. The design layer may be formed using the same printing method or coating means as the first surface layer and the second surface layer. At least one of the first surface layer and the second surface layer may be a designable layer that contains pigments, printing inks and the like. In this manner, a design transfer layer carried on a release layer may be obtained.

The design transfer layer may have a variety of thicknesses, and it is generally not less than approximately 0.4 µm, not less than approximately 1.0 µm, or not less than approximately 1.6 µm, and not more than approximately 200 µm, not more than approximately 100 µm, or not more than approximately 20 µm.

The design transfer layer may be introduced into the heat-expanding film by the procedure below, for example. According to one embodiment, a method for producing a heat-expanding film is provided, the method containing a step of preparing a design transfer layer containing a thermally adherable first surface layer and a thermally adherable second surface layer; a step of thermally adhering the first surface layer with the layers constituting the heat-expanding film, such as an outermost layer, a metal brightening layer, a substrate layer, a polyurethane thermal adhesive layer, and the like; and a step of thermally adhering the second surface layer with the other layers that constitute the heat-expanding film, such as an outermost layer, a metal brightening layer, a substrate layer, a polyurethane thermal adhesive layer, and the like.

The temperature of thermal adhesion is generally not less than approximately 40° C., not less than approximately 50° C., or not less than approximately 60° C., and not greater than approximately 200° C., not greater than approximately 160° C., or not greater than approximately 140° C. Thermal adhesion may be performed under pressure or not under pressure. The design transfer layer of one embodiment does not require pressure during thermal adhesion. The design transfer layer of this embodiment is advantageously used in inline production such as roll-to-roll style or the like because it does not require a pressuring process or device. For example, a relatively thin design transfer layer can generally be thermally adhered easily at atmospheric pressure. The thickness of the room temperature thermal adhesive design transfer layer may be not less than approximately 0.4 µm, not less than approximately 1.0 µm, or not less than approximately 1.6 µm, and not more than approximately 20 µm, not more than approximately 10 µm, or not more than approximately 5 µm.

The outermost layer, polyurethane thermal adhesive layer, substrate layer and/or bonding layer may also include the same coloring material such as inorganic pigments, organic pigments, aluminum brightening material, pearlescent brightening material, and the like described for the design layer. When the area extension percentage of a heat-expanding film having a design layer such as a color layer or the like becomes large, that is, when it expands significantly, the color exhibited by the design layer can change, and the performance of concealing the article that is adhered to may be reduced, but by coloring the polyurethane thermal adhesive layer placed between the design layer and the article with a pigment such as titanium oxide, zinc oxide, carbon black, or the like, high concealing properties can be realized even when expanded significantly.

In a heat-expanding film containing a metal brightening layer such as a tin vapor deposition film, indium vapor deposition film, or the like, such as a heat-expanding film used as a substitute film for chrome plating or the like, performance of concealing the article that is adhered to can be improved by incorporating the aforementioned pigments into the polyurethane thermal adhesive layer. A tin vapor deposition film may have deposition defects such as pinholes in the vapor deposition film surface, but such defects can be made unnoticeable by coloring the polyurethane thermal adhesive layer.

It is advantageous if the amount of pigment included in the polyurethane thermal adhesive layer is not less than approximately 0.1 mass %, not less than approximately 0.2 mass %, or not less than approximately 0.5 mass %, and not greater than approximately 50 mass %, not greater than approximately 20 mass %, or not greater than approximately 10 mass % of the polyurethane thermal adhesive layer.

The thickness of the heat-expanding film is generally not less than approximately 10 μm, not less than approximately 25 μm, or not less than approximately 50 μm, and not more than approximately 2000 μm, not more than approximately 1000 μm, or not more than approximately 500 μm. By the thickness of the heat-expanding film being within the aforementioned range, the heat-expanding film can be made to sufficiently conform to an article with a complex shape, and thus a structure with excellent appearance can be provided.

The scratch resistance of the heat-expanding film can be evaluated through pencil hardness in accordance with JIS K5600-5-4. The pencil hardness of the heat-expanding film of a certain embodiment is 2B or greater when measured by fixing the heat-expanding film on a glass plate with the polyurethane thermal adhesive layer facing the surface of the glass plate and then scratching the outermost layer at a speed of 600 mm/min. The pencil hardness may be not below 6B, not below 5B, not below 4B, or not below 3B.

The method for manufacturing the heat-expanding film is not particularly limited. The layers can be manufactured as already described. The heat-expanding film can be manufactured by, for example, forming each layer on a liner such as PET film or the like having a release treated surface, or on another layer that constitutes the heat-expanding film, and then laminating them. Alternatively, the layers can be sequentially laminated on a single liner by repeating a coating process and, as needed, a drying or curing process. The heat-expanding film may also be formed by multi-layer extrusion of the material of each layer.

Figure 5:
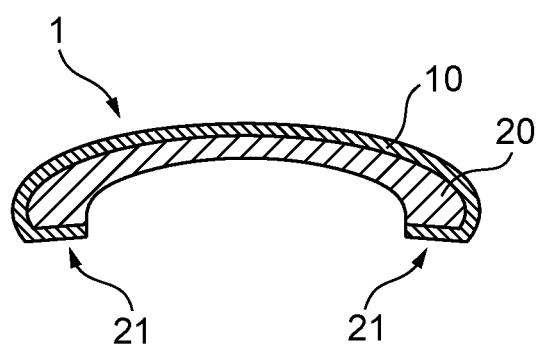
FIG. 5 is a schematic cross-sectional view of a structure according to an embodiment of the present disclosure.

One embodiment of the present disclosure provides a structure containing an article and a heat-expanding film that has been applied to the surface of the article. One example of this type of structure is illustrated by the schematic cross-sectional view in FIG. 5. The structure 1 contains an article 20 covered by a heat-expanding film 10. By applying the heat-expanding film 10 to the article 20 by IM or TOM, a structure in which the heat-expanding film and the article have been integrated can be formed. In another embodiment, by extruding a thermoplastic material that serves as the article onto the heat-expanding film 10, a structure in which the heat-expanding film and the extruded thermoplastic material have been integrated can be formed. IM, TOM and extrusion may be performed by conventional known methods.

The article may be made of a variety of materials, and materials having a variety of flat surfaces and three-dimensional shapes can be used. The heat-expanding film of the present disclosure exhibits particularly excellent adhesive strength to and can be advantageously used with polycarbonates, acrylonitrile/butadiene/styrene copolymers, or mixtures or blends thereof.

A method for applying a heat-expanding film to an article using TOM will be described as an example below in reference to FIGS. 6A to 6E.

Figure 6A:
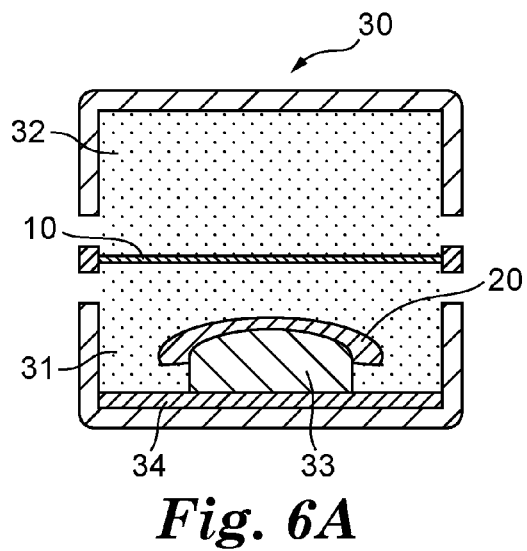
FIGS. 6A to 6E are schematic explanatory drawings illustrating the steps of applying a heat-expanding film to an article using a vacuum thermocompression bonding apparatus.

As illustrated in FIG. 6A, an exemplary vacuum thermocompression bonding apparatus 30 has a first vacuum chamber 31 and a second vacuum chamber 32 on the bottom and top, respectively, and between these upper and lower vacuum chambers, has a jig on which is set the heat-expanding film 10 to be glued to the article 20 to be adhered to. Furthermore, a partition plate 34 and a pedestal 33 are disposed on a lift table 35 (not illustrated) capable of ascending and descending in the first vacuum chamber 31 on the bottom, and the article 20 such as a three-dimensional object or the like is set on this pedestal 33. As this type of vacuum thermocompression bonding apparatus, a commercially available product, for example, a two-sided vacuum molding machine (manufactured by Fu-se Vacuum Forming Ltd.), may be used.

As illustrated in FIG. 6A, the heat-expanding film 10 is first set between the upper and lower vacuum chambers in a state in which the first vacuum chamber 31 and the second vacuum chamber 32 of the vacuum thermocompression bonding apparatus 30 are open to atmospheric pressure. The article 20 is set on the pedestal 33 in the first vacuum chamber 31.

Figure 6B:
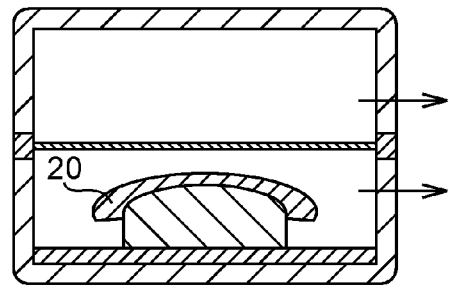
Figure 6C:
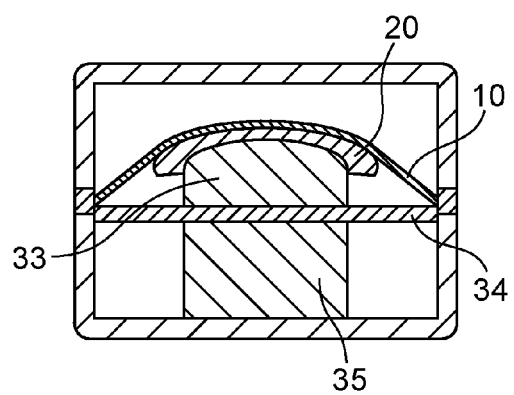

Next, as illustrated in FIG. 6B, the first vacuum chamber 31 and the second vacuum chamber 32 are closed, the respective chambers are depressurized, and a vacuum (for example, approximately 0 atm when atmospheric pressure is taken as 1 atm) is drawn inside each chamber. The film is heated after or simultaneously with drawing of the vacuum. Next, as illustrated in FIG. 6C, the lift table 35 is raised, and the article 20 is pushed up to the second vacuum chamber 32. The heating can be performed, for example, using a lamp heater built into a ceiling part of the second vacuum chamber 32. The heating temperature generally may be not less than approximately 50° C. and not greater than approximately 180° C., and preferably not less than approximately 130° C. or not greater than approximately 160° C. The degree of vacuum of the vacuum atmosphere generally may be not greater than approximately 0.10 atm, not greater than approximately 0.05 atm, or not greater than approximately 0.01 atm, when atmospheric pressure is taken as 1 atm.

Figure 6D:
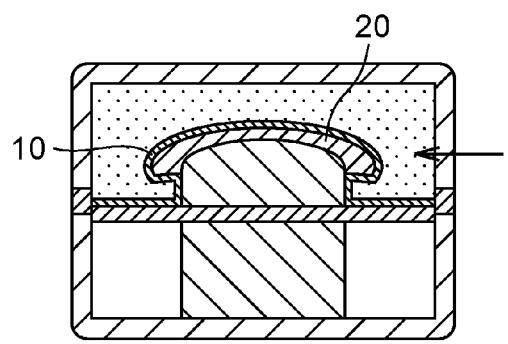

The heated heat-expanding film 10 is pressed against the surface of the article 20 and expanded. After that or at the same time, the interior of the second vacuum chamber 32 is pressurized to an appropriate pressure (for example, from 3 atm to 1 atm), as illustrated in FIG. 6D. Due to the pressure difference, the heat-expanding film 10 is firmly adhered to the exposed surface of the article 20 and is expanded to conform to the three-dimensional shape of the exposed surface, and thereby forms a firmly adhered coating on the article surface. After performing depressurization and heating in the state in FIG. 6B, the interior of the second vacuum chamber 32 can be pressurized in that state, and the exposed surface of the article 20 can be covered with the heat-expanding film 10.

Figure 6E:
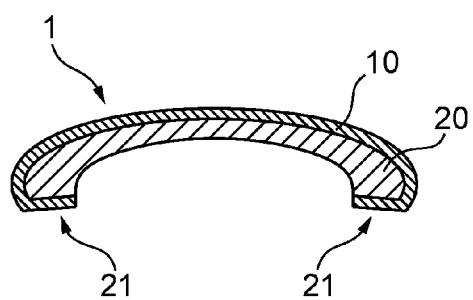

After this, the lower and upper first vacuum chamber 31 and second vacuum chamber 32 are again opened to atmospheric pressure, and the article 20 covered with the heat-expanding film 10 is removed. As illustrated in FIG. 6E, the edges of the heat-expanding film 10 adhered to the surface of the article 20 are trimmed, and the TOM process is complete. In this way, the heat-expanding film 10 wraps around to the rear surfaces 21 on the ends of the article 20 and neatly covers the exposed surface, and thus a structure 1 covered with a good wrapping can be obtained.

The maximum area extension percentage of the heat-expanding film after molding is generally not less than approximately 50%, not less than approximately 100%, or not less than approximately 200%, and not greater than approximately 1000%, not greater than approximately 500%, or not greater than approximately 300%. The area extension percentage is defined as area extension percentage (%)=(B−A)/A (where A is the area of a certain portion of the heat-expanding film before molding, and B is the area of the portion corresponding to A of the heat-expanding film after molding). For example, if the area of a certain portion of the heat-expanding film is 100 cm$^2$ before molding and the area of that portion of the article after molding is 250 cm$^2$, it is 150%. The maximum area extension percentage means the value at the location of highest area extension percentage in the heat-expanding film on the entire article surface. For example, when a flat film is affixed to a three-dimensional article by TOM, the portion of the film that first affixes to the article hardly expands and has an area extension percentage of nearly 0%, while the ends that are affixed last are expanded significantly and achieve an area extension percentage of 200% or more, and thus the area extension percentage varies widely depending on the location. Since the acceptability of molding is determined based on whether or not a defect occurs, such as non-conformance to the article or a tear in the film, in a portion that was expanded the most, the area extension percentage in the portion that was expanded the most, that is, the maximum area extension percentage, serves as the substantial index for the acceptability of the molded product, rather than the average area extension percentage of the overall molded product. The maximum area extension percentage is determined by, for example, printing 1-mm squares on the entire surface of the heat-expanding film before molding and then measuring the change in the areas thereof after molding, or by measuring the thickness of the heat-expanding film before and after molding.

The heat-expanding film of the present disclosure may be used for the purpose of decoration of automotive parts, household appliances, railroad cars, building materials, and the like, in various molding techniques such as TOM, IM, extrusion, and the like, but it can be used particularly advantageously in TOM.

EXAMPLES

In the following examples, specific embodiments of the present disclosure are exemplified, but the present invention is not restricted thereto. All parts and percentages are by mass unless otherwise indicated.

The reagents, raw materials, and the like used in these examples are shown below in Table 1.

TABLE 1

| Compound name, brand name or abbreviation | Description | Supplier |
|---|---|---|
| 3-methyl-1,5-pentanediol | | Wako Pure Chemical Industries, Ltd. (Osaka, Japan) |
| 1,4-butanediol | | Wako Pure Chemical Industries, Ltd. (Osaka, Japan) |
| 1,6-hexanediol | | Wako Pure Chemical Industries, Ltd. (Osaka, Japan) |
| Kuraray Polyol PHMC-1050 | Polycarbonate diol of 3-methylpentanediol/1,6-hexanediol = 50:50, of molecular weight 1000 | Kuraray Co., Ltd. (Chiyoda-ku, Tokyo, Japan) |
| Polylite (TM) OD-X-240 | Polyester polyol of 1,4-butanediol/adipic acid, of molecular weight 1000 | DIC Corporation (Chiyoda-ku, Tokyo, Japan) |
| Polylite (TM) OD-X-2640 | Polyester polyol of 1,6-hexanediol/adipic acid, of molecular weight 2000 | DIC Corporation (Chiyoda-ku, Tokyo, Japan) |
| PTMG 650 | Polytetramethylene ether glycol, average molecular weight 650 | Mitsubishi Chemical Corporation (Chiyoda-ku, Tokyo, Japan) |
| PTMG 1500 | Polytetramethylene ether glycol, average molecular weight 1500 | Mitsubishi Chemical Corporation (Chiyoda-ku, Tokyo, Japan) |
| Ethylene carbonate | | Wako Pure Chemical Industries, Ltd. (Osaka, Japan) |
| Adipic acid | | Wako Pure Chemical Industries, Ltd. (Osaka, Japan) |
| Isophthalic acid | | Wako Pure Chemical Industries, Ltd. (Osaka, Japan) |
| 1,6-hexamethylene diisocyanate | | Wako Pure Chemical Industries, Ltd. (Osaka, Japan) |
| 4,4'-diphenylmethane diisocyanate | | Wako Pure Chemical Industries, Ltd. (Osaka, Japan) |
| Dicyclohexylmethane-4,4'-diisocyanate | | Wako Pure Chemical Industries, Ltd. (Osaka, Japan) |
| Duranate (TM) TPC-100 | Isocyanate crosslinking agent, NCO content 23.1% | Asahi Kasei Chemicals Corp. (Chiyoda-ku, Tokyo, Japan) |
| Dibutyltin dilaurate | | Wako Pure Chemical Industries, Ltd. (Osaka, Japan) |
| Titanium tetrabutyrate | | Wako Pure Chemical Industries, Ltd. (Osaka, Japan) |
| YP50S | Phenoxy resin | Nippon Steel & Sumikin Chemical Co., Ltd. (Chiyoda-ku, Tokyo, Japan) |
| G2 | Polyester film, thickness 50 μm | Teijin, Ltd. (Chiyoda-ku, Tokyo, Japan) |
| Technolloy (TM) S014G | Acrylic film, thickness 125 μm | Sumitomo Chemical Co., Ltd. (Chuo-ku, Tokyo, Japan) |
| VTP-NT CD Black (A) | Gravure ink | DIC Graphics Corporation (Chiyoda-ku, Tokyo, Japan) |
| SEIKABOND (TM) E-295NT | Polyester polyol 60 mass % ethyl acetate solution | Dainichiseika Color & Chemicals Mfg. Co., Ltd. (Chuo-ku, Tokyo, Japan) |

TABLE 1-continued

| Compound name, brand name or abbreviation | Description | Supplier |
|---|---|---|
| C-55 | Isocyanate curing agent | Dainichiseika Color & Chemicals Mfg. Co., Ltd. (Chuo-ku, Tokyo, Japan) |
| Methyl ethyl ketone | | Wako Pure Chemical Industries, Ltd. (Osaka, Japan) |

Polyurethane films used as the polyurethane thermal adhesive layer were prepared by the following procedures.

Preparation of Polyurethane 1 (PUR1) Polycarbonate-Based Polyurethane

Polycarbonate diol of number average molecular weight 1000 was prepared by adding 0.00072 parts of lead acetate trihydrate as a catalyst to 53.0 parts of 3-methyl-1,5-pentanediol and 47.0 parts of ethylene carbonate, and reacting for 16 hours at 160° C. 64.0 parts of the above polycarbonate diol, 8.0 parts of 1,4-butanediol, 28.0 parts of 1,6-hexamethylene diisocyanate, and 0.01 parts of dibutyltin dilaurate were mixed, and after reacting for 3 hours at 180° C., a film 100 μm thick was produced using a compression molder. The molecular weight of the obtained polyurethane measured by GPC was number average molecular weight 28,000 and weight average molecular weight 89,000.

Preparation of Polyurethane 2 (PUR2) Polycarbonate-Based Polyurethane

Polyester polyol of number average molecular weight 500 was prepared by adding 40 ppm of titanium tetrabutyrate as a catalyst to 21.6 parts of adipic acid and 29.6 parts of 1,4-butanediol, and performing an esterification reaction at 240° C. 56.0 parts of the above polyester polyol, 15.0 parts of Kuraray polyol PMHC-1050, 2.0 parts of 1,6-hexanediol, 27.0 parts of 1,6-hexamethylene diisocyanate and 0.01 parts of dibutyltin dilaurate were mixed, and after reacting for 3 hours at 180° C., films 50 μm thick and 100 μm thick were produced using a compression molder. The molecular weight of the obtained polyurethane measured by GPC was number average molecular weight 46,000 and weight average molecular weight 120,000.

Preparation of Polyurethane 3 (PUR3) Polyester-Based Polyurethane 63.0 parts of Polylite™ OD-X-240, 6.0 parts of 1,4-butanediol, 31.0 parts of 4,4'-diphenylmethane diisocyanate and 0.01 parts of dibutyltin dilaurate were mixed, and after reacting for 3 hours at 180° C., a film 200 μm thick was produced using a compression molder. The molecular weight of the obtained polyurethane measured by GPC was number average molecular weight 50,000 and weight average molecular weight 100,000.

Preparation of Polyurethane 4 (PUR4) Polyester-Based Polyurethane

Polyester polyol of number average molecular weight 1200 was prepared by adding 40 ppm of titanium tetrabutyrate as a catalyst to 49.0 parts of adipic acid, 14.5 parts of isophthalic acid and 36.5 parts of 1,4-butanediol, and performing an esterification reaction at 240° C. 63.0 parts of the above polyester polyol, 5.0 parts of 1,4-butanediol, 32.0 parts of dicyclohexylmethane-4,4'-diisocyanate, and 0.01 parts of dibutyltin dilaurate were mixed, and after reacting for 3 hours at 180° C., a film 150 μm thick was produced using a compression molder. The molecular weight of the obtained polyurethane measured by GPC was number average molecular weight 51,000 and weight average molecular weight 120,000.

Preparation of Polyurethane 5 (PUR5) Polyether-Based Polyurethane 72.0 parts of polytetramethylene ether glycol PTMG 650, 28.0 parts of 4,4'-diphenylmethane diisocyanate, and 0.01 parts of dibutyltin dilaurate were mixed, and after reacting for 3 hours at 180° C., a film 200 μm thick was produced using a compression molder. The molecular weight of the obtained polyurethane measured by GPC was number average molecular weight 31,000 and weight average molecular weight 65,000.

Preparation of Polyurethane 6 (PUR6) Polyester-Based Polyurethane 57.0 parts of Polylite™ OD-X-240, 7.5 parts of 1,4-butanediol, 35.5 parts of 4,4'-diphenylmethane diisocyanate, and 0.01 parts of dibutyltin dilaurate were mixed, and after reacting for 3 hours at 180° C., a film 150 μm thick was produced using a compression molder. The molecular weight of the obtained polyurethane measured by GPC was number average molecular weight 47,000 and weight average molecular weight 96,000.

Preparation of Polyurethane 7 (PUR7) Polyether-Based Polyurethane 85.0 parts of polytetramethylene ether glycol PTMG 1500, 15.0 parts of dicyclohexylmethane-4,4'-diisocyanate, and 0.01 parts of dibutyltin dilaurate were mixed, and after reacting for 3 hours at 180° C., a film 150 μm thick was produced using a compression molder. The molecular weight of the obtained polyurethane measured by GPC was number average molecular weight 48,000 and weight average molecular weight 140,000.

The characteristics of the obtained polyurethane films and heat-expanding films were evaluated using the following test methods.

Molecular Weight of Polyurethane Films

The molecular weight of the polyurethane films is determined by gel permeation chromatography (GPC) under the following conditions.

Device: Agilent 1200 series LC system

PL Gel Guard Column (50 mm×7.5 mm, inside diameter 10 μm)

PL Gel Mixed-B×2 (300 mm×7.5 mm, inside diameter 10 μm)

Solvent: Tetrahydrofuran (THF) or N-methylpyrrolidone (NMP)

Flow rate: 1.0 mL/minute

Detector: RI

Column temperature: 40° C. (THF), 60° C. (NMP)

Concentration: 0.1%

Sample quantity: 100 μL

Standard: Polystyrene (THF), polymethyl methacrylate (NMP)

Tensile Strength of Polyurethane Films at 25° C. and 135° C.

Tensile strength and elongation of the polyurethane films are determined according to JIS K 7311 (1995) using the following conditions.

(1) Test Temperature 25° C.
Specimen: Dumbbell test piece according to JIS K 7311 (1995), width 5.0 mm, gauge length 20.0 mm
Pulling rate: 300 mm/minute
(2) Test Temperature 135° C.
Specimen: Dumbbell test piece according to JIS K 7311 (1995), width 10.0 mm, gauge length 20.0 mm
Pulling rate: 300 mm/minute The following characteristic values are calculated from measured values.

(1) Tensile Strength at 50% Elongation (T50)
$T_{50}$ (MPa)=$F_{50}$/A
$F_{50}$ (N): Measured value at 50% elongation, A: Cross-sectional area (mm$^2$)
(2) Fracture Strength ($T_B$)
$T_B$ (MPa)=$F_B$/A
$F_B$ (N): Measured value at fracture, A: Cross-sectional area (mm$^2$)
(3) Elongation (E)
E (%)=$[(L_1-L_0)/L_0]\times 100$
$L_1$: Gauge length at fracture (mm), $L_0$: Initial gauge length (mm) (=20.0 mm)

Viscoelasticity Characteristics of Polyurethane Films

Viscoelasticity characteristics are measured using an ARES dynamic viscoelasticity measuring device (manufactured by T.A. Instruments Japan, Shinagawa-ku, Tokyo, Japan). Samples are produced by punching films to a diameter of 7.9 mm, and the shear storage modulus G' and coefficient of loss tan δ (=shear loss modulus G"/shear storage modulus G') is obtained by measuring in shear mode at frequency 1.0 Hz at a starting temperature of 180° C., an ending temperature of −20° C., and a temperature reduction rate of 5° C./minute.

Initial Adhesive Property (Cross-Cut Test)

Initial adhesive property is evaluated based on the cross-cut tape test of JIS K5400: 1990 (out of print). Specifically, using TOM, the heat-expanding film is adhered to a PC/ABS sheet (CK43 black, manufactured by TechnoPolymer Co., Ltd., Minato-ku, Tokyo, Japan) such that the area extension percentage at molding temperature 135° C. is 100%, and then, using a cutter, slits are made in the film in a cross-cut pattern at 1 mm intervals to form 100 segments. Sellotape™ (CT405AP-18, manufactured by Nichiban Co., Ltd., Bunkyo-ku, Tokyo, Japan) is pressed on top of the film in which slits were made in a cross-cut pattern, and is then pulled in the 90-degree direction. The number of cross-cut segments remaining on the film is counted and used as the value of adhesive property evaluation. If the number of remaining segments is 100 (100/100), it is evaluated as "best," and if 90 or more (90/100 or more), it is evaluated as "good."

Heat Cycle Degradation Test

Using TOM, the heat-expanding film is adhered to a PC/ABS sheet (CK43 black, manufactured by TechnoPolymer Co., Ltd., Minato-ku, Tokyo, Japan) such that the area extension percentage at molding temperature 135° C. is 100%. After molding by TOM, the appearance is observed after undergoing the following heat cycles.

(1) Heated from 25° C. to 105° C. in 1 hour, and held at 105° C. for 6 hours.
(2) Cooled to −30° C. in 2 hours, and held at −30° C. for 2 hours.
(3) Heated and humidified to 50° C./95% RH in 2 hours, and held at 50° C./95% RH for 6 hours.
(4) Cooled to −30° C. (dry) in 2 hours, and held at −30° C. for 2 hours.
(5) Heated to 25° C. in 1 hour.
(6) Steps (1) to (5) repeated five times.

Adhesive Strength

Using TOM, the heat-expanding film is adhered to a PC/ABS sheet (CK43 black, manufactured by TechnoPolymer Co., Ltd., Minato-ku, Tokyo, Japan) such that the area extension percentage at molding temperature 135° C. is 100%. The obtained laminate is cut to a width of 25 mm and length of 50 mm to produce a test piece. The adhesive strength is taken as the average of values measured when heat-expanding films are peeled from the PC/ABS sheet by pulling the test piece in the 180-degree direction at temperature 23° C. at a pulling rate of 300 mm/minute and distance between grips of approximately 50 mm, using a Tensilon™ universal testing machine RTC-1325A (load cell 50 N, UR-50N-3) (manufactured by Orientec Co., Ltd., Toshima-ku, Tokyo, Japan).

Production of Heat-Expanding Film

A film containing an acrylic resin outermost layer, a bonding layer, a metal vapor deposition film and a polyurethane thermal adhesive layer in that order was produced.

Acrylic Resin Outermost Layer

An acrylic copolymer of methyl methacrylate (MMA)/2-hydroxyethyl methacrylate (HEMA)=97 mass %/3 mass % was prepared by general solution polymerization, and obtained in the form of an ethyl acetate/butyl acetate solution containing 35 mass % solids. To this solution, isocyanate crosslinking agent Duranate™ TPA-100 was added to result in 2.7 mass % solids relative to the copolymer. The obtained solution was coated on a polyester film having a thickness of 75 μm and then dried for 10 minutes at 100° C. and then 10 minutes at 150° C. In this manner, an acrylic resin outermost layer 50 μm thick was obtained on a polyester film.

Metal Vapor Deposition Film on Polyurethane Thermal Adhesive Layer

Tin was vapor-deposited on a polyurethane thermal adhesive layer. A polyurethane thermal adhesive layer was pre-laminated on a polyester film 50 μm thick, and during the deposition process, it was loaded on this film. Deposition conditions are as follows.

Device: Vacuum vapor deposition device EX-400 (ULVAC, Inc., Chigasaki City, Kanagawa Prefecture, Japan)
Energy source of target metal evaporation: Electron beam
Thickness of tin vapor deposition film: 430 Angstroms
Deposition rate of tin vapor deposition film: 5 Angstroms/second Lamination of Acrylic Resin Outermost Layer and Polyurethane Thermal Adhesive Layer 100 parts by mass of polyester polyol SEIKABOND™ E-295NT and 2.9 parts by mass of isocyanate curing agent C-55 were mixed, and this was coated onto the acrylic resin outermost layer prepared as described above. It was heated for 3 minutes in a 100° C. oven, and a bonding layer 15 μm thick was formed on the acrylic resin outermost layer.

The acrylic surface resin layer and the polyurethane thermal adhesive layer were placed such that the bonding layer and the metal vapor deposition film were facing each other, and these layers were laminated at 50° C. and nip pressure 2.0 kgf to form a film.

The evaluation results of the obtained films are shown in Table 2 below.

ing to form a design layer. The thickness of the design layer measured by a thickness gauge was approximately 2 μm.

TABLE 2

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Polyurethane | PUR1 | PUR2 | PUR2 | PUR3 | PUR4 | PUR5 | PUR6 | PUR7 |
| Polyurethane skeleton[1] | PC | PC | PC | PES | PES | PE | PES | PE |
| Mw | 89,000 | 120,000 | 120,000 | 100,000 | 120,000 | 65,000 | 96,000 | 140,000 |
| Mw/Mn | 3.2 | 2.6 | 2.6 | 2.0 | 2.4 | 2.1 | 2.0 | 2.9 |
| Tensile strength at 25° C., 50% elongation (MPa) | 9.5 | 9.0 | 9.0 | 7.3 | 5.4 | 8.3 | 10.5 | 10.8 |
| Fracture strength at 25° C. (MPa) | 30.8 | 38.7 | 38.7 | 51.0 | 34.0 | 40.8 | 68.1 | 53.3 |
| Fracture elongation at 25° C. (%) | 540 | 540 | 540 | >800 | 650 | >800 | 790 | 570 |
| Fracture strength at 135° C. (MPa) | 6.9 | 13.2 | 13.2 | 3.3 | 0.05 | 7.1 | 6.8 | 0.07 |
| Elongation at 135° C. (%) | >800 | >800 | >800 | >800 | >800 | >800 | >800 | >800 |
| Storage modulus at −20° C. (Pa) | $1.48 \times 10^8$ | $1.14 \times 10^8$ | $1.14 \times 10^8$ | $1.55 \times 10^8$ | $1.45 \times 10^8$ | $9.06 \times 10^7$ | $1.80 \times 10^8$ | $1.87 \times 10^8$ |
| Storage modulus at 110° C. (Pa) | $1.63 \times 10^7$ | $3.06 \times 10^7$ | $3.06 \times 10^7$ | $2.49 \times 10^6$ | $2.30 \times 10^5$ | $7.83 \times 10^6$ | $1.02 \times 10^7$ | $4.74 \times 10^5$ |
| Ratio of storage modulus (−20° C./110° C.) | 9.1 | 3.7 | 3.7 | 62.2 | 630 | 11.6 | 17.7 | 396 |
| Storage modulus at 150° C. (Pa) | $1.17 \times 10^4$ | $5.33 \times 10^4$ | $5.33 \times 10^4$ | $3.17 \times 10^4$ | $2.05 \times 10^4$ | $1.03 \times 10^6$ | $1.19 \times 10^6$ | $4.15 \times 10^4$ |
| Coefficient of loss tanδ at 150° C. | 2.3 | 1.2 | 1.2 | 2.6 | 3.3 | 0.3 | 0.3 | 2.4 |
| Thickness (μm) | 100 | 50 | 100 | 200 | 150 | 200 | 150 | 150 |
| Initial adhesive property (cross-cut test) | 100/100 | 100/100 | 100/100 | 100/100 | 100/100 | 0/100 | 0/100 | 100/100 |
| Heat cycle degradation test | No Change | No Change | No Change | No Change | End peeling | End peeling | End peeling | End peeling |
| Adhesive strength at 25° C. (N/25 mm) | 22.4 | >30.0 | >30.0 | >30.0 | >30.0 | 0.0 | 0.0 | 6.4 |
| Adhesive strength at 100° C. (N/25 mm) | 21.0 | >30.0 | >30.0 | 16.4 | >30.0 | 0.0 | 0.0 | 12.1 |

[1] PC: Polycarbonate skeleton; PES: Polyester skeleton; PE: Polyether skeleton

Example 5

A heat-expanding decorative film containing a thermally transferrable design transfer layer was produced by the following procedure.

157.5 parts of Polylite™ OD-X-2640, 0.9 parts of 1,4-butanediol, 1.2 parts of 1,6-hexanediol, and 430.1 parts of ethyl acetate were mixed, and a homogeneous solution was prepared. To the obtained solution were added 25.0 parts of 4,4′-diphenylmethane diisocyanate and 0.01 parts of dibutyltin dilaurate, and they were reacted for 24 hours at 80° C. The molecular weight of the obtained polyurethane (PUR8) measured by GPC was number average molecular weight 84,000 and weight average molecular weight 200,000, and the glass transition temperature Tg was −10° C.

PUR8 and methyl ethyl ketone solution of 35 mass % phenoxy resin YP50S were mixed to result in a solids ratio of 35:65, and this was further diluted with methyl ethyl ketone to adjust the solids to 7.5%. The obtained solution was coated onto polyester film G2 using a #12 Meyer bar, and it was dried for 3 minutes at 60° C. to form a thermally adherable first surface layer. The thickness of the thermally adherable first surface layer measured by a thickness gauge was approximately 2 μm.

On the first surface layer, gravure ink VTP-NT CD black (A) was printed in a prescribed pattern using gravure print- The same solution as the first surface layer was coated onto the design layer using a #12 Meyer bar, and it was dried for 3 minutes at 60° C. to form a thermally adherable second surface layer. The thickness of the thermally adherable second surface layer measured by a thickness gauge was approximately 2 μm.

In this manner, a design transfer sheet containing a polyester film (release layer) and a design transfer layer releasably mounted on the polyester film was produced. The design transfer layer contained, in order from the polyester film side, a first surface layer, a design layer and a second surface layer.

Using a vacuum vapor deposition machine, metallic tin was vapor-deposited to a thickness of 430 Angstroms on one face of PUR2 film 100 μm thick. In this manner, both a polyurethane thermal adhesive layer having a tin vapor deposition film and a polyurethane thermal adhesive layer not having a tin vapor deposition film were prepared. The vapor deposition conditions were as follows.

Device: Vacuum vapor deposition device EX-400 (UL-VAC, Inc., Chigasaki City, Kanagawa Prefecture, Japan)
Energy source of target metal evaporation: Electron beam
Deposition rate of tin vapor deposition film: 5 Angstroms/second The second surface layer of the design transfer layer and the polyurethane thermal adhesive layer not having a tin vapor deposition film or the polyurethane thermal adhesive layer having a tin vapor deposition film were placed facing each other, and laminates were formed by gluing them using a roll laminator at temperature 130° C. and pressure 2 kgf. The polyester films were peeled from the obtained laminates, and the exposed first surface layer and an acrylic film Technolloy™ S014G were placed facing each other, and two types of evaluation sample were produced by gluing them using a roll laminator at temperature 130° C. and pressure 2 kgf.

Initial adhesive property was evaluated using the evaluation samples. The appearance of the samples produced for use in initial adhesive property evaluation was good. The initial adhesive property was 100/100 for both the polyurethane film not having a tin vapor deposition film and the polyurethane film having a tin vapor deposition film. In the adhesive property evaluation, peeling occurred between the tape and the acrylic film, and no interlayer peeling was seen.

Samples for initial adhesive property evaluation were prepared in the same manner as above. The obtained samples were put in a 110° C. oven for 500 hours and then removed and left to stand for 1 day at room temperature, after which appearance and adhesive property were evaluated in the same manner. The appearance of the samples after the heated acceleration test was good, and when adhesive property was tested, it was 100/100 for both the polyurethane film not having a tin vapor deposition film and the polyurethane film having a tin vapor deposition film. In the adhesive property evaluation, peeling occurred between the tape and the acrylic film, and no interlayer peeling was seen.

Visual Defects

The heat-expanding film is observed from the urethane thermal adhesive layer, and the number of defects not less than 0.1 mm$^2$ in size that can be seen in 1.0 m$^2$ of the heat-expanding film is counted.

Polyurethane films used as a polyurethane thermal adhesive layer were prepared by the following procedures.

Preparation of Polyurethane 9 (PUR9) Polycarbonate-Based Polyurethane

Polyester polyol of number average molecular weight 500 was prepared by adding 40 ppm of titanium tetrabutyrate as a catalyst to 21.6 parts of adipic acid and 29.6 parts of 1,4-butanediol, and performing an esterification reaction at 240° C. 56.0 parts of the above polyester polyol, 15.0 parts of Kuraray polyol PMHC-1050, 2.0 parts of 1,6-hexanediol, 27.0 parts of 1,6-hexamethylene diisocyanate and 0.005 parts of dibutyltin dilaurate were mixed, and after reacting for 4 hours at 170° C., films 50 μm thick were produced using a compression molder. The molecular weight of the obtained polyurethane measured by GPC was number average molecular weight 27,000 and weight average molecular weight 134,000.

Preparation of Polyurethane 10 (PUR10) Polycarbonate-Based Polyurethane

Polyester polyol of number average molecular weight 500 was prepared by adding 40 ppm of titanium tetrabutyrate as a catalyst to 21.6 parts of adipic acid and 29.6 parts of 1,4-butanediol, and performing an esterification reaction at 240° C. 56.0 parts of the above polyester polyol, 15.0 parts of Kuraray polyol PMHC-1050, 2.0 parts of 1,6-hexanediol, 27.0 parts of 1,6-hexamethylene diisocyanate and 0.005 parts of dibutyltin dilaurate were mixed, and after reacting for 4 hours at 175° C., films 50 μm thick were produced using a compression molder. The molecular weight of the obtained polyurethane measured by GPC was number average molecular weight 27,000 and weight average molecular weight 126,000.

Preparation of Polyurethane 11 (PUR11) Polycarbonate-Based Polyurethane

Polyester polyol of number average molecular weight 500 was prepared by adding 40 ppm of titanium tetrabutyrate as a catalyst to 21.6 parts of adipic acid and 29.6 parts of 1,4-butanediol, and performing an esterification reaction at 240° C. 56.0 parts of the above polyester polyol, 15.0 parts of Kuraray polyol PMHC-1050, 2.0 parts of 1,6-hexanediol, 27.0 parts of 1,6-hexamethylene diisocyanate and 0.005 parts of dibutyltin dilaurate were mixed, and after reacting for 3 hours at 185° C., films 50 μm thick were produced using a compression molder. The molecular weight of the obtained polyurethane measured by GPC was number average molecular weight 23,000 and weight average molecular weight 112,000.

Preparation of Polyurethane 12 (PUR12) Polycarbonate-Based Polyurethane

Polyester polyol of number average molecular weight 500 was prepared by adding 40 ppm of titanium tetrabutyrate as a catalyst to 21.6 parts of adipic acid and 29.6 parts of 1,4-butanediol, and performing an esterification reaction at 240° C. 56.0 parts of the above polyester polyol, 15.0 parts of Kuraray polyol PMHC-1050, 2.0 parts of 1,6-hexanediol, 27.0 parts of 1,6-hexamethylene diisocyanate and 0.002 parts of dibutyltin dilaurate were mixed, and after reacting for 8 hours at 160° C., films 50 μm thick were produced using a compression molder. The molecular weight of the obtained polyurethane measured by GPC was number average molecular weight 25,000 and weight average molecular weight 216,000.

Preparation of Polyurethane 13 (PUR13) Polycarbonate-Based Polyurethane

Polyester polyol of number average molecular weight 500 was prepared by adding 40 ppm of titanium tetrabutyrate as a catalyst to 21.6 parts of adipic acid and 29.6 parts of 1,4-butanediol, and performing an esterification reaction at 240° C. 56.0 parts of the above polyester polyol, 15.0 parts of Kuraray polyol PMHC-1050, 2.0 parts of 1,6-hexanediol, 27.0 parts of 1,6-hexamethylene diisocyanate and 0.005 parts of dibutyltin dilaurate were mixed, and after reacting for 4 hours at 160° C., films 50 μm thick were produced using a compression molder. The molecular weight of the obtained polyurethane measured by GPC was number average molecular weight 22,000 and weight average molecular weight 151,000.

Production of Heat-Expanding Film

A film containing an outermost layer, a substrate layer, a thermally transferrable design transfer layer, a metal vapor deposition film and a polyurethane thermal adhesive layer in that order was produced.

Outermost Layer

As the outermost layer, a two-layer film of different composition ratios of vinylidene fluoride and PMMA {(6 μm outer layer made of a mixture of 80 wt % polyvinylidene fluoride and 20 wt % PMMA)/(24 μm inner layer made of a mixture of 20 wt % polyvinylidene fluoride and 80 wt % PMMA)} (Denka DX film 14S0230 manufactured by Denki Kagaku Kogyo K.K., thickness 30 μm) was prepared.

Substrate Layer

As the substrate layer, acrylic film Technoloy™ S014G was prepared.

Thermally Transferrable Design Transfer Layer

PUR8 and methyl ethyl ketone solution of 35 mass % phenoxy resin YP50S were mixed to result in a solids ratio of 38:62, and this was further diluted with methyl ethyl ketone to adjust the solids to 7.5%. The obtained solution was coated onto polyester film G2 using a #12 Meyer bar, and it was dried for 3 minutes at 60° C. to form a thermally adherable first surface layer. The thickness of the thermally adherable first surface layer measured by a thickness gauge was approximately 2 μm.

On the first surface layer, gravure ink VTP-NT CD black (A) was printed in a prescribed pattern using gravure printing to form a design layer. The thickness of the design layer measured by a thickness gauge was approximately 2 μm.

The same solution as the first surface layer was coated onto the design layer using a #12 Meyer bar, and it was dried for 3 minutes at 60° C. to form a thermally adherable second surface layer. The thickness of the thermally adherable second surface layer measured by a thickness gauge was approximately 2 μm.

Metal Vapor Deposition Film on Polyurethane Thermal Adhesive Layer

Tin was vapor-deposited on a polyurethane thermal adhesive layer. A polyurethane thermal adhesive layer was pre-laminated on a polyester film 50 μm thick, and during the deposition process, it was loaded on this film. Deposition conditions are as follows.

Device: Vacuum vapor deposition device EX-400 (UL-VAC, Inc., Chigasaki City, Kanagawa Prefecture, Japan)
Energy source of target metal evaporation: Electron beam
Thickness of tin vapor deposition film: 430 Angstroms
Deposition rate of tin vapor deposition film: 5 Angstroms/second The thermally transferrable design transfer layer and the polyurethane thermal adhesive layer were disposed such that the thermally transferrable design transfer layer and the metal vapor deposition layer were in contact, and these layers were laminated at 115° C. The polyester film was peeled from the obtained laminate, and on the exposed surface, the substrate layer and the outermost layer were disposed in that order and laminated at 105° C. to produce a film.

The evaluation results of the obtained film are shown below in Table 3.

TABLE 3

|  | Example 5 | Example 6 | Example 7 | Example 8 | Example 9 |
|---|---|---|---|---|---|
| Polyurethane | PUR9 | PUR10 | PUR11 | PUR12 | PUR13 |
| Polyurethane skeleton[1)] | PC | PC | PC | PC | PC |
| Mw | 134,000 | 126,000 | 112,000 | 216,000 | 151,000 |
| Mw/Mn | 5.0 | 4.6 | 4.9 | 8.5 | 6.8 |
| Tensile strength at 25° C., 50% elongation (MPa) | 9.8 | 8.7 | 9.9 | 11.3 | 9.3 |
| Fracture strength at 25° C. (MPa) | 68.3 | 60.7 | 62.2 | 64.1 | 49.0 |
| Fracture elongation at 25° C. (%) | >800 | >800 | >800 | >800 | >800 |
| Fracture strength at 135° C. (MPa) | 15.9 | 13.3 | 13.0 | 13.3 | 8.8 |
| Elongation at 135° C. (%) | >800 | >800 | >800 | >800 | >800 |
| Storage modulus at −20° C. (Pa) | $9.70 \times 10^7$ | ND | $9.36 \times 10^7$ | $8.20 \times 10^7$ | $7.07 \times 10^7$ |
| Storage modulus at 110° C. (Pa) | $2.50 \times 10^7$ | ND | $2.08 \times 10^7$ | $1.60 \times 10^7$ | $1.35 \times 10^7$ |
| Ratio of storage modulus (−20° C./110° C.) | 3.9 | ND | 4.5 | 5.1 | 5.2 |
| Storage modulus at 150° C. (Pa) | $9.15 \times 10^4$ | ND | $1.00 \times 10^4$ | $2.09 \times 10^4$ | $6.97 \times 10^3$ |
| Coefficient of loss tanδ at 150° C. | 1.1 | ND | 2.1 | 1.1 | 1.6 |
| Thickness (μm) | 50 | 50 | 50 | 50 | 50 |
| Number of visual defects (/m²) | 6 | 13 | 14 | 24 | 24 |

What is claimed is:

1. A film capable of covering an article having a three-dimensional shape by heat expansion,
the film comprising:
an outermost layer disposed on an outermost surface; and
a polyurethane thermal adhesive layer, which contains a thermoplastic polyurethane selected from the group consisting of polyester-based polyurethanes and polycarbonate-based polyurethanes and is thermally adhered to the article, wherein the film is expanded to conform to the three-dimensional shape of the article when adhered; wherein
the polyurethane thermal adhesive layer has a fracture strength of not less than 1 MPa at 135° C., a storage modulus at 150° C. and frequency 1.0 Hz of from $5\times10^3$ Pa to $5\times10^5$ Pa, and a coefficient of loss tan δ of not less than 0.1, and a ratio of the weight average molecular weight to the number average molecular weight of the thermoplastic polyurethane is not greater than 9.0.

2. The film according to claim 1, wherein a ratio of a storage modulus at −20° C. and a storage modulus at 110° C. (−20° C. storage modulus/110° C. storage modulus) of the polyurethane thermal adhesive layer measured at frequency 1.0 Hz is not greater than 100.

3. The film according to claim 1, wherein the thermoplastic polyurethane is a polycarbonate-based polyurethane, and further comprising a metal brightening layer disposed on the polyurethane thermal adhesive layer between the outermost layer and the polyurethane thermal adhesive layer.

4. The film according to claim 1, wherein polyisocyanate is incorporated into the thermoplastic polyurethane in an amount from 20 mass % to 40 mass % relative to the total of the thermoplastic polyurethane.

5. The film according to claim 1, wherein the polyurethane thermal adhesive layer has been colored.

6. A coated article obtained by covering and integrating an article with the film according to claim 1.

7. The coated article according to claim 6, wherein the article comprises a molded article.

8. The film according to claim 7, wherein the molded article comprises polycarbonate (PC) or acrylonitrile/butadiene/styrene copolymer (ABS).

9. A decorative film capable of covering an article having a three-dimensional shape by heat expansion,
the film comprising
an outermost layer disposed on an outermost surface;
a polyurethane thermal adhesive layer, which contains a thermoplastic polyurethane selected from the group consisting of polyester-based polyurethanes and polycarbonate-based polyurethanes and is thermally adhered to the article during the heat expansion; and
a design layer disposed between the outermost layer and the polyurethane thermal adhesive layer; wherein
the polyurethane thermal adhesive layer has a fracture strength of not less than 1 MPa at 135° C., a storage modulus at 150° C. and frequency 1.0 Hz of from $5\times10^3$ Pa to $5\times10^5$ Pa, and a coefficient of loss tan δ of not less than 0.1, and a ratio of the weight average molecular weight to the number average molecular weight of the thermoplastic polyurethane is not greater than 9.0.

10. The decorative film according to claim 9, containing a thermally transferrable design transfer layer as the design layer.

11. A coated article obtained by covering and integrating an article with the decorative film according to claim 9.

* * * * *